(12) United States Patent
Aburaya et al.

(10) Patent No.: US 11,098,410 B2
(45) Date of Patent: Aug. 24, 2021

(54) ARTIFICIAL PHOTOSYNTHESIS MODULE

(71) Applicants: FUJIFILM Corporation, Tokyo (JP); Japan Technological Research Association of Artificial Photosynthetic Chemical Process, Tokyo (JP)

(72) Inventors: Yoshihiro Aburaya, Ashigara-kami-gun (JP); Jiro Tsukahara, Ashigara-kami-gun (JP); Satoshi Yoshida, Ashigara-kami-gun (JP); Hiroshi Nagate, Ashigara-kami-gun (JP); Hiroyuki Kobayashi, Kashiwa (JP)

(73) Assignees: FUJIFILM Corporation, Tokyo (JP); JAPAN TECHNOLOGICAL RESEARCH ASSOCIATION OF ARTIFICIAL PHOTOSYNTHESIS CHEMICAL PROCESS, Tokyo (JP)

( * ) Notice: Subject to any disclaimer, the term of this patent is extended or adjusted under 35 U.S.C. 154(b) by 126 days.

(21) Appl. No.: 16/212,297

(22) Filed: Dec. 6, 2018

(65) Prior Publication Data

US 2019/0112721 A1    Apr. 18, 2019

Related U.S. Application Data

(63) Continuation of application No. PCT/JP2017/017414, filed on May 8, 2017.

(30) Foreign Application Priority Data

Jun. 7, 2016   (JP) .............................. JP2016-113743

(51) Int. Cl.
   *C25B 1/02*     (2006.01)
   *C25B 11/091*   (2021.01)
   (Continued)

(52) U.S. Cl.
   CPC .............. *C25B 11/091* (2021.01); *C25B 1/04* (2013.01); *C25B 1/55* (2021.01); *C25B 9/17* (2021.01); *C25B 9/65* (2021.01); *C25B 11/051* (2021.01)

(58) Field of Classification Search
   CPC .. C25B 1/003; C25B 1/04; C25B 1/02; C25B 1/00; C25B 9/08; C25B 9/06
   See application file for complete search history.

(56) References Cited

U.S. PATENT DOCUMENTS

2016/0372271 A1\* 12/2016 Kitagawa ............ C25B 11/0405
2017/0130346 A1\*  5/2017 Sato .................... C25B 11/0478
2017/0191172 A1   7/2017 Nagate et al.

FOREIGN PATENT DOCUMENTS

CN   101629300 A   1/2010
CN   101748421 A   6/2010
(Continued)

OTHER PUBLICATIONS

Chinese Office Action and Search Report for corresponding Chinese Application No. 201780034716.5, dated Mar. 17, 2020, with an English translation.

(Continued)

*Primary Examiner* — Zulmariam Mendez
(74) *Attorney, Agent, or Firm* — Birch, Stewart, Kolasch & Birch, LLP

(57) ABSTRACT

Provided are a photocatalyst electrode, an artificial photosynthesis module, and an artificial photosynthesis device that have low electrical resistance, even in a case where the area is increased, in a case where a transparent conductive layer is used. The photocatalyst electrode is a photocatalyst electrode that has a substrate, a transparent conductive layer, a photocatalyst layer, and a linear metal electrical conductor, and splits water with light to produce a gas. The substrate, the transparent conductive layer, and the photocatalyst layer (Continued)

are laminated in this order, and the linear metal electrical conductor is in contact with the transparent conductive layer. The artificial photosynthesis module has the oxygen evolution electrode that splits the water with the light to produce oxygen, and a hydrogen evolution electrode that splits the water with the light to produce hydrogen. The oxygen evolution electrode and the hydrogen evolution electrode are disposed in series in a traveling direction of the light. At least one of the oxygen evolution electrode or the hydrogen evolution electrode has the configuration of the above-described photocatalyst electrode. The artificial photosynthesis device has the artificial photosynthesis module, and circulates and utilizes water.

5 Claims, 8 Drawing Sheets

(51) Int. Cl.
    C25B 1/04    (2021.01)
    C25B 1/55    (2021.01)
    C25B 9/17    (2021.01)
    C25B 9/65    (2021.01)
    C25B 11/051    (2021.01)

(56) References Cited

FOREIGN PATENT DOCUMENTS

| CN | 102482789 A | 5/2012 |
|---|---|---|
| CN | 102713010 B | 10/2015 |
| JP | 2006-265697 A | 10/2006 |
| JP | 2009-274891 A | 11/2009 |
| JP | 2010-228981 A | 10/2010 |
| JP | 2013-23728 A | 2/2013 |
| JP | 2014-198644 A | 10/2014 |
| JP | 2015-196869 A | 11/2015 |
| JP | 2016-102239 A | 6/2016 |
| WO | WO 2015/146012 A1 | 10/2015 |
| WO | WO 2016/052002 A1 | 4/2016 |

OTHER PUBLICATIONS

Chen et al., "All Solution-Processed Lead Halide Perovskite-BiV0$_4$ Tandem Assembly for Photolytic Solar Fuels Production," Journal of the American Chemical Society, vol. 137, 2015 (Published Dec. 27, 2014), pp. 974-981.

International Preliminary Report on Patentability and Written Opinion of the International Searching Authority (forms PCT/IB/373, PCT/ISA/237 and PCT/IB/326), dated Dec. 20, 2018, for corresponding International Application No. PCT/JP2017/017414, with a Written Opinion translation.

International Search Report (form PCT/ISA/210), dated Aug. 8, 2017, for corresponding International Application No. PCT/JP2017/017414, with an English translation.

Japanese Notice of Reasons for Refusal dated Jul. 23, 2019, for corresponding Japanese Patent Application No. 2018-522376, with English translation.

* cited by examiner

ARTIFICIAL PHOTOSYNTHESIS MODULE

CROSS-REFERENCE TO RELATED APPLICATIONS

This application is a Continuation of PCT International Application No. PCT/JP2017/017414 filed on May 8, 2017, which claims priority under 35 U.S.C. § 119(a) to Japanese Patent Application No. 2016-113743 filed on Jun. 7, 2016. The above application is hereby expressly incorporated by reference, in its entirety, into the present application.

BACKGROUND OF THE INVENTION

1. Field of the Invention

The present invention relates to a photocatalyst electrode, an artificial photosynthesis module, and an artificial photosynthesis device that split water with light to produce gas, and particularly, to a photocatalyst electrode, an artificial photosynthesis module, and an artificial photosynthesis device that use a transparent conductive layer.

2. Description of the Related Art

Nowadays, water is splitted using a photocatalyst and utilizing solar light energy, which is renewable energy, to obtain gases, such as hydrogen gas and oxygen gas.

For example, JP2006-265697A discloses a water splitting semiconductor light electrode that includes at least a photocatalyst film, a transparent conductive film, a solar battery made of a transparent substrate, a transparent conductive film, a charge transporting layer, a semiconductor layer on which a coloring agent is carried and supported, and a metal substrate, and a hydrogen-producing catalyst layer, from a light-receiving surface side, and in which an electrode for electrically connecting the transparent conductive films on a surface and a back face of the transparent substrate to each other is buried in the transparent substrate. Additionally, JP2006-265697A discloses a water splitting apparatus that has the above-described water-splitting semiconductor electrode, and an electrolyte aqueous solution in a housing in which the light-receiving surface side is transparent, and in which the housing has an oxygen outlet and a hydrogen outlet.

WO2015/146012 discloses a photoelectrochemical cell that includes a photoelectric conversion layer having a first face and a second face, a first electrode provided on the first face of the photoelectric conversion layer, a first catalyst layer including a plurality of catalyst parts disposed on the first electrode and a transparent dielectric part disposed in a gap between the plurality of catalyst parts, a second electrode provided on the second face of the photoelectric conversion layer, and a second catalyst layer electrically connected to the second electrode, and in which the catalyst parts are provided outside the conductive part. The photoelectrochemical cell of WO2015/146012 is disposed within an electrolytic bath, and is used by being immersed in the electrolytic solution.

Journal of American Chemical Society (2015), v137, 974 to 981 discloses a tandem module that uses an electrode having a $BiVO_4$ thin film formed on an optically transparent electrode of a fluorine-doped tin oxide (FTO) as an oxygen evolution electrode and that produces oxygen and hydrogen.

SUMMARY OF THE INVENTION

The above-described JP2006-265697A is used in the electrolyte aqueous solution, WO2015/146012 is used in the electrolytic solution, the oxygen evolution electrode of Journal of American Chemical Society (2015), v137, 974 to 981 is also used in the aqueous solution, and all are suitable for use in liquid.

In JP2006-265697A, a through-hole is formed in the transparent substrate, such as a glass substrate, and the electrode is formed by filling the through-hole with an electrode-forming material. The transparent conductive films are formed on both faces of the transparent substrate, and the transparent conductive films and the electrode are electrically connected to each other. In the configuration of JP2006-265697A, the protection of the electrode is performed. However, it is necessary to form the electrode through a solution process or the like in making the electrode, the shape of the surface of the electrode is turned into a rough shape under the influence of dryness or the like, contact resistance is generated at an interface between the electrode and the transparent electrode, and the effect is not easily obtained.

In WO2015/146012, the catalyst parts are provided outside the conductive part. However, in a case where the photoelectrochemical cell is used by being immersed in the electrolytic solution, there are concerns that adverse effects are exerted such that the electrolytic solution enters from the interface between the conductive part and the catalyst parts, and the electrical resistance of the conductive part increases.

Although Journal of American Chemical Society (2015), v137, 974 to 981 uses the fluorine-doped tin oxide (FTO), the area of an optical active region is as small as 0.54 $cm^2$ in Journal of American Chemical Society (2015), v137, 974 to 981. It is known that the transparent conductive film made of the fluorine-doped tin oxide (FTO) or the like has high electrical resistance. However, in the current situation, the resistance in a case where the electrode area is increased is not taken into consideration at all in Journal of American Chemical Society (2015), v137, 974 to 981.

An object of the invention is to solve the aforementioned problems based on the related art, and to provide a photocatalyst electrode, an artificial photosynthesis module, and an artificial photosynthesis device that have low electrical resistance, even in a case where the area is increased, in a case where a transparent conductive layer is used.

In order to achieve the above-described object, the invention provides a photocatalyst electrode that has a substrate, a transparent conductive layer, a photocatalyst layer, and a linear metal electrical conductor, and splits water with light to produce a gas. The substrate, the transparent conductive layer, and the photocatalyst layer are laminated in this order, and the linear metal electrical conductor is in contact with the transparent conductive layer.

It is preferable that the linear metal electrical conductor is disposed on the transparent conductive layer and is coated with a protective layer.

It is preferable that the linear metal electrical conductor is disposed on the substrate.

It is preferable that the linear metal electrical conductor is disposed at intervals of 5 mm or more and less than 50 mm.

It is preferable that a length of an upper base of the linear metal electrical conductor is shorter than a length of a lower base.

It is preferable that the linear metal electrical conductor has a taper angle. The taper angle is preferably 5° or more and 60° or less, and the taper angle is more preferably 5° or more and 40° or less.

It is preferable that the transparent conductive layer is formed of a transparent conductive oxide.

It is preferable that a thickness of the transparent conductive layer is 100 nm or more and 500 nm or less.

It is preferable that the gas produced by the water being splitted by the photocatalyst electrode is oxygen or hydrogen. For example, the gas produced by the water being splitted by the photocatalyst electrode is oxygen.

The invention provides an artificial photosynthesis module comprising an oxygen evolution electrode that splits water with light to produce oxygen and has a photocatalyst layer, a transparent conductive layer, and a substrate in this order from an incidence direction of the light; and a hydrogen evolution electrode that splits the water with the light to produce hydrogen and has a photocatalyst layer, a transparent conductive layer, and a substrate in this order from the incidence direction of the light. The oxygen evolution electrode and the hydrogen evolution electrode being disposed in series in a traveling direction of the light. The oxygen evolution electrode and the hydrogen evolution electrode are electrically connected to each other via a conducting wire. At least one electrode of the oxygen evolution electrode or the hydrogen evolution electrode has a linear metal electrical conductor that is in contact with the transparent conductive layer and electrically connected to the conducting wire.

It is preferable that the linear metal electrical conductor is disposed on the transparent conductive layer and is coated with a protective layer.

It is preferable that the linear metal electrical conductor is disposed on the substrate.

It is preferable that the linear metal electrical conductor is disposed at intervals of 5 mm or more and less than 50 mm.

It is preferable that a length of an upper base of the linear metal electrical conductor is shorter than a length of a lower base.

It is preferable that the linear metal electrical conductor has a taper angle. The taper angle is preferably 5° or more and 60° or less, and the taper angle is more preferably 5° or more and 40° or less.

It is preferable that the transparent conductive layer is formed of a transparent conductive oxide.

It is preferable that a thickness of the transparent conductive layer is 100 nm or more and 500 nm or less.

The invention provides an artificial photosynthesis device comprising an artificial photosynthesis module that splits water to produce a gas; a tank that stores the water; a supply pipe that is connected to the tank and the artificial photosynthesis module and supplies the water to the artificial photosynthesis module; a discharge pipe that is connected to the tank and the artificial photosynthesis module and recovers the water from the artificial photosynthesis module; a pump that circulates the water between the tank and the artificial photosynthesis module via the supply pipe and the discharge pipe; and a gas recovery unit that recovers the produced gas from the artificial photosynthesis module. A plurality of the artificial photosynthesis modules are disposed. Each artificial photosynthesis module includes an oxygen evolution electrode that splits water with light to produce oxygen and has a photocatalyst layer, a transparent conductive layer, and a substrate in this order from an incidence direction of the light; and a hydrogen evolution electrode that splits the water with the light to produce hydrogen and has a photocatalyst layer, a transparent conductive layer, and a substrate in this order from the incidence direction of the light. The oxygen evolution electrode and the hydrogen evolution electrode are disposed in series in a traveling direction of the light. The oxygen evolution electrode and the hydrogen evolution electrode are electrically connected to each other via a conducting wire. At least one electrode of the oxygen evolution electrode or the hydrogen evolution electrode has a linear metal electrical conductor that is in contact with the transparent conductive layer and electrically connected to the conducting wire.

According to the invention, even in a case where the transparent conductive layer is used, electrical resistance can be made small, and creation efficiency can be improved.

DESCRIPTION OF THE PREFERRED EMBODIMENTS

Hereinafter, a photocatalyst electrode, an artificial photosynthesis module, and an artificial photosynthesis device according to preferred embodiments of the invention will be described in detail with reference to the preferred embodiments illustrated in the attached drawings.

In addition, in the following, "to" showing a numerical range includes numerical values described on both sides thereof. For example, $\varepsilon$ being a numerical value $\alpha 1$ to a numerical value $\beta 1$ means that the range of $\varepsilon$ is a range including the numerical value $\alpha 1$ and the numerical value $\beta 1$, and in a case where these are expressed by mathematical symbols, $\alpha 1 \leq \varepsilon \leq \beta 1$ is satisfied.

Angles, such as "parallel", "perpendicular", and "orthogonal", include error ranges generally allowed in the technical field unless otherwise specified.

The term "transparent" means that the light transmittance is at least 60% or more, preferably 80% or more, more preferably 85%, and still more preferably 90%, in a region having a wavelength of 380 to 780 nm, unless particularly mentioned.

The light transmittance is measured using "Method of Testing Transmittance, Reflectivity, Emissivity, and Solar Heat Acquisition Rate of Plate Glasses" specified in Japanese Industrial Standard (JIS) R 3106-1998.

Figure 1:
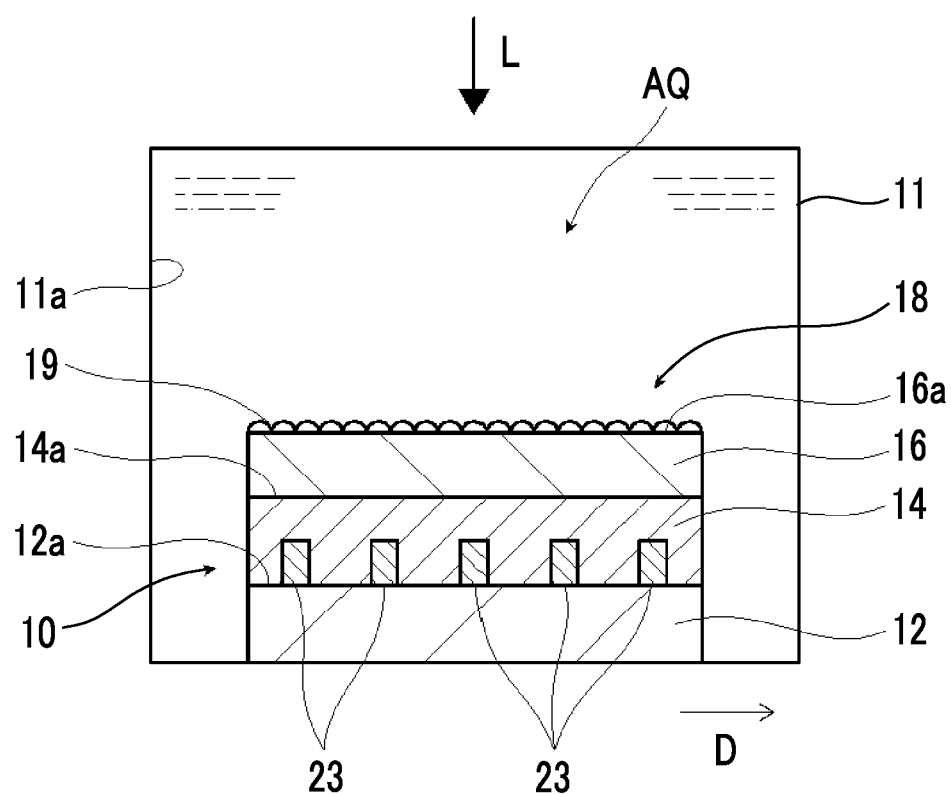
FIG. 1 is a schematic cross-sectional view illustrating a first example of a photocatalyst electrode of an embodiment of the invention.
Figure 2:
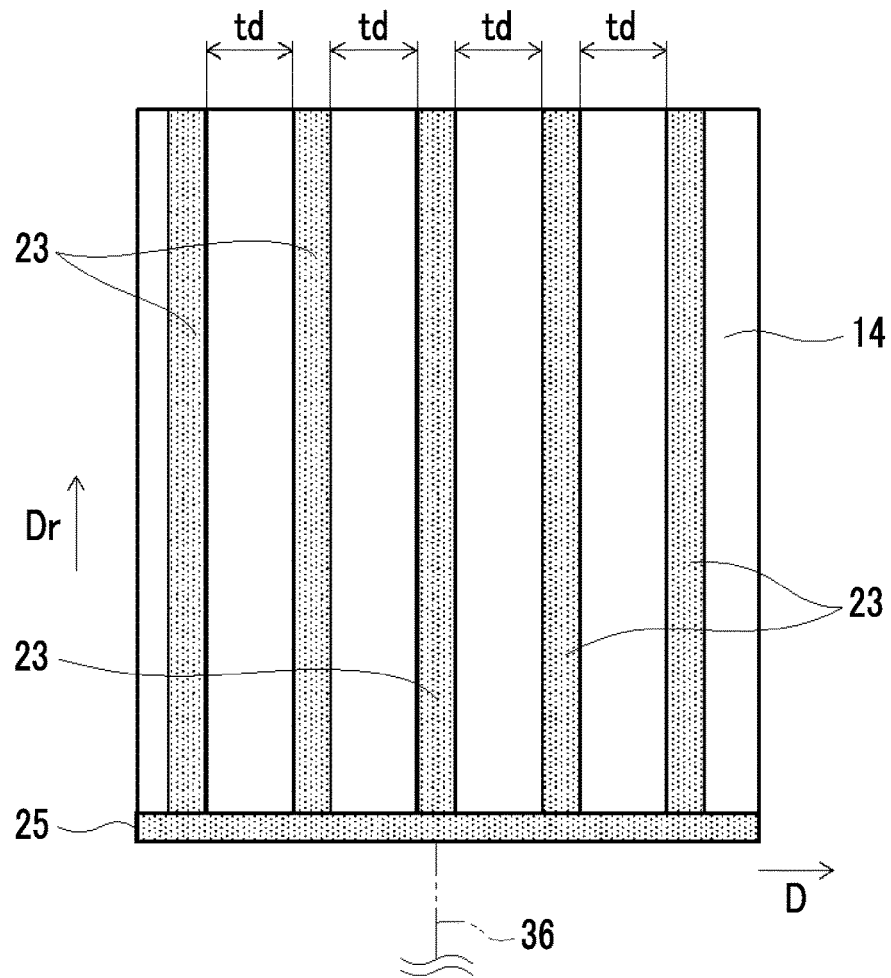
FIG. 2 is a schematic plan view illustrating a conductive layer of the photocatalyst electrode of the first example of the embodiment of the invention.

FIG. 1 is a schematic cross-sectional view illustrating a first example of a photocatalyst electrode of an embodiment of the invention, and FIG. 2 is a schematic plan view illustrating a conductive layer of the photocatalyst electrode of the first example of the embodiment of the invention.

A photocatalyst electrode 10 illustrated in FIG. 1 is used after being immersed in an interior 11a of a container 11 in which the interior 11a is filled with water AQ. In a case where the photocatalyst electrode 10 is irradiated with light L in a state where the photocatalyst electrode 10 is immersed in the water AQ, the photocatalyst electrode 10 splits the water AQ with the radiated light L to produce gas.

The container 11 is not particularly limited in terms of configuration and is formed of, for example, acrylic resin as long as the container 11 can hold the water AQ in the interior 11a and the photocatalyst electrode 10 in the interior 11a can be irradiated with the light L. It is preferable that the container 11 satisfies the specifications of the "transparent" to be described below.

Distilled water, cooling water to be used in a cooling tower, and the like are included in the water AQ. Additionally, an electrolytic aqueous solution is also included in the water AQ. Here, the electrolytic aqueous solution is a liquid having $H_2O$ as a main component, may be an aqueous solution having water as a solvent and containing a solute, and is, for example, an electrolytic solution containing strong alkali (KOH (potassium hydroxide)) and $H_2SO_4$, a sodium sulfate electrolytic solution, a potassium phosphate buffer solution, or the like. It is preferable that the electrolytic aqueous solution is $H_3BO_3$ adjusted to pH (hydrogen ion index) 9.5.

The photocatalyst electrode 10 has a substrate 12, a transparent conductive layer 14, a photocatalyst layer 16, and a linear metal electrical conductors 23, and the substrate 12, the transparent conductive layer 14, and the photocatalyst layer 16 are laminated in this order. The linear metal electrical conductors 23 are in contact with the transparent conductive layer 14. In FIG. 1, in the photocatalyst electrode 10, the transparent conductive layer 14 is provided on a surface 12a of the substrate 12, the photocatalyst layer 16 is provided on a surface 14a of the transparent conductive layer 14, and a co-catalyst layer 18 is provided on a surface 16a of the photocatalyst layer 16. The co-catalyst layer 18 is constituted of, for example, a plurality of co-catalyst particles 19. In addition, the linear metal electrical conductor 23 is also simply referred to as a metal electrical conductor 23.

The substrate 12 supports the respective layers of the photocatalyst electrode 10 and is required to have an electrical insulating property. The substrate 12 is not particularly limited, and materials according to the applications of the photocatalyst electrode 10 are used as the substrate 12. As the substrate 12, for example, a soda lime glass substrate or a ceramic substrate can be used. Additionally, a substrate in which an insulating layer is formed on a metal substrate can be used as the substrate 12. Here, as the metal substrate, a metal substrate, such as an Al substrate or a steel use stainless (SUS) substrate, or a composite metal substrate, such as a composite Al substrate formed of a composite material of Al, and for example, other metals, such as SUS, is available. In addition, the composite metal substrate is also a kind of the metal substrate, and the metal substrate and the composite metal substrate are collectively and simply referred to as the metal substrate. Moreover, a metal substrate with an insulating film having an insulating layer formed by anodizing a surface of the Al substrate or the like can also be used as the substrate 12. The substrate 12 may be flexible or may not be flexible. In addition, in a case where the photocatalyst electrode 10 is required to be transparent in addition to the above-described ones, the substrate 12 is also required to be transparent. In addition, for example, a glass plate, such as high strain point glass or non-alkali glass, or a polyimide material can be used as the substrate 12.

Here, the expression "the substrate 12 is transparent" means that the light transmittance of the substrate 12 is 60% or more in a region having a wavelength of 380 to 780 nm. The above-described light transmittance is measured by a spectrophotometer. As the spectrophotometer, for example, V-770 (product name), which is an ultraviolet-visible spectrophotometer manufactured by JASCO Corporation, is used.

In addition, when the transmittance is T %, the transmittance is expressed by T=(Σλ(Measurement substance+Substrate)/Σλ(Substrate))×100%. The above-described measurement substance is a glass substrate, and a substrate reference is air. The range of integration is up to a light-receiving wavelength of a photocatalyst layer, in light having a wavelength of 380 to 780 nm. In addition, JIS R 3106-1998 can be referred to for the measurement of the transmittance.

The transparent conductive layer 14 is a layer that receives charges or holes generated in the photocatalyst layer 16, and has electric conductivity.

For example, a plurality of the linear metal electrical conductors 23 are disposed on the substrate 12 in contact with the surface 12a of the substrate 12, and the plurality of linear metal electrical conductors 23 are buried within the transparent conductive layer 14. The linear metal electrical conductors 23 are isolated from the water AQ by the transparent conductive layer 14, corrosion of the linear metal electrical conductors 23 reacting with the water AQ is suppressed, and an increase in electrical resistance of the linear metal electrical conductors 23 resulting from corrosion is suppressed. Additionally, in a case where the linear metal electrical conductors 23 are in contact with the water AQ, electric current leakage occurs. However, since the linear metal electrical conductors 23 are isolated from the water AQ by the transparent conductive layer 14, the electric current leakage does not occur. For this reason, the linear metal electrical conductors 23 are suitable for use in a state where the linear metal electrical conductors 23 are immersed in the water AQ.

In addition, the transparent conductive layer 14 can transmit the light L. In the transparent conductive layer 14, as will be described below, the transmitted light amount of the light L can be changed by changing the proportion of the linear metal electrical conductors 23 on the surface 12a of the substrate 12.

Moreover, since the linear metal electrical conductors 23 are isolated from the water AQ by the transparent conductive layer 14, the linear metal electrical conductors 23 are is suitable for use in a state where the linear metal electrical conductors 23 are immersed in the water AQ. It is preferable that the thickness of the transparent conductive layer 14 is 100 nm or more and 500 nm or less. In a case where the thickness of the transparent conductive layer 14 is less than 100 nm, this is not preferable because since the function as the conductive layer deteriorates. Additionally, in a case where the thickness of the transparent conductive layer 14 exceeds 500 nm, this is not preferable because there is a concern that the transmission of light may be hindered and the transmittance may decrease from a viewpoint of the transmittance. In addition, the range of the thickness of the transparent conductive layer 14 is more preferably 100 nm or more 400 nm or less, and most preferably, 100 nm or more and 200 nm or less.

It is preferable that the transparent conductive layer 14 is formed of, for example, a transparent conductive oxide, and in a case where the transparent conductive layer is immersed in the water AQ, elution of components, or the like, does not occur, and there is no reaction with the water AQ, such as oxidation.

As the transparent conductive oxide, for example, an indium tin oxide (ITO), a fluorine-doped tin oxide (FTO), or the like is used. The light transmittance of the transparent conductive layer 14 is preferably 70% or more, and more preferably 80% or more.

A transparent conductive film formed of the indium tin oxide (ITO) or the like generally has a high electrical resistance value as compared to that of ordinary metal films. For this reason, in a case where the transparent conductive film is used for the transparent conductive layer 14 to increase the area of the photocatalyst electrode, it becomes clear that, due to the resistance loss of the transparent conductive layer 14, or the like, the photocurrent density decreases and the creation efficiency decreases. However, the charges or holes generated in the photocatalyst layer 16 are trapped by the metal electrical conductors 23 by disposing the linear metal electrical conductors 23 within the transparent conductive layer 14. For this reason, it is unnecessary for the above-described generated charges or holes to move over a long distance within the transparent conductive layer 14 having a higher resistance than metal. As a result, a decrease in photocurrent density resulting from the resistance loss or the like can be suppressed, and a decrease in creation efficiency can be suppressed. Moreover, by configuring the linear metal electrical conductors 23 to be isolated from the water AQ with the transparent conductive layer 14, an electric current is not short-circuited. Even in a case where the area of the photocatalyst electrode 10 is made as large as 10 cm×10 cm as compared to the above-described transparent conductive film, in the photocatalyst electrode 10, a decrease in photocurrent density resulting from the resistance loss or the like can be suppressed, and a decrease in creation efficiency can be suppressed. A result, it is possible to provide the photocatalyst electrode 10 in which the performance degradation of the photocatalyst electrode 10 having large area can be suppressed and a high photocurrent density can be obtained.

Moreover, the transparent conductive layer 14 can change the transmitted light amount of light in a case where transparency is required as described above, and can be of a form of requiring transparency for the photocatalyst electrode 10.

Here, as devices using the transparent conductive film, solar cells are known in which a conductive layer, a photoelectric conversion layer, and a transparent electrode are laminated on a substrate, and an extraction electrode is formed on the transparent electrode. However, the solar cells are considered to be used in units of ten years, and are configured to avoid contact with water as much as possible in order to suppress degradation of the solar cells. In this way, the solar cells avoid contact with water as much as possible, and are not suitable for use in a liquid. In contrast, the photocatalyst electrode 10 is suitable for use in a state where the photocatalyst electrode 10 is immersed in the water AQ, and splits the water AQ to produce gas in a state where the photocatalyst electrode 10 is immersed in the water AQ.

As illustrated in FIG. 2, the plurality of linear metal electrical conductors 23 are disposed parallel to each other, for example, at intervals td in a direction D. The plurality of linear metal electrical conductors 23 are electrically connected to a linear metal conducting wire 25 provided at one end of each linear metal electrical conductor 23 in an extension direction thereof. The metal conducting wire 25 is disposed within the transparent conductive layer 14 and is isolated from the water AQ. The metal conducting wire 25 is electrically connected to an external conducting wire 36 in an artificial photosynthesis module 30 to be described below. In FIG. 2, the extension direction of the metal electrical conductors 23 is a direction parallel to the direction Dr.

The intervals td are preferably 5 mm or more and less than 50 mm, more preferably 15 mm or more and 25 mm or less, and still more preferably 20 mm. In a case where the intervals td are 5 mm or more and less than 50 mm, it is possible to obtain the transparent conductive layer 14 that is transparent and a sufficient current collecting effect. The gas creation efficiency deteriorates because the substrate 12 becomes opaque and the photocatalyst layer 16 cannot receive light in a case where the intervals td are less than 5 mm. Additionally, in a case where the intervals td are 50 mm or more, the electrical resistance of the transparent conductive layer 14 becomes high, the resistance loss occurs, and the gas creation efficiency deteriorates.

In addition, although the intervals td of the plurality of metal electrical conductors 23 are not limited to regular intervals, it is preferable that the intervals td are regular intervals from a viewpoint of securing the in-plane uniformity of the electrical resistance of the transparent conductive layer 14. In any case, it is preferable that the wiring intervals of the metal electrical conductors 23 are within the above-described range.

The arrangement form of the linear metal electrical conductors 23 is not particularly limited to being disposed parallel to each other, which is illustrated in FIG. 2.

Moreover, the metal electrical conductors 23 may not be linear, respectively, and the width of metal electrical conductors 23 themselves may not be uniform. In any case, it is preferable that the average intervals of the metal electrical conductors 23 are within the range of the above-described intervals td.

Here, the term "linear" in the linear metal electrical conductors 23 means a state where each conductor is continuous without being divided in the extension direction, as illustrated in FIG. 2. In addition, the term "linear" is not particularly limited as long as the conductor is continuous without being divided in the extension direction as described above, and not only may include a straight line illustrated in FIG. 2 but also may include a winding line, such as a wavy line, a curved line including a wavy line, and a combination of the straight line and the curved line, in addition to the straight line.

The metal electrical conductors 23 do not play the role of electrically connecting an electrode and an electrode to each other, and play a role of lowering the electrical resistance of the entire transparent conductive layer 14 by placing a route, through which electricity flows more easily than the transparent conductive layer 14, in the transparent conductive layer 14. For this reason, at least portions of the metal electrical conductors 23 in contact with the transparent conductive layer 14 do not have coatings of insulators. Additionally, the external conducting wire 36 (refer to FIG. 9) that electrically connecting two electrodes to each other, and the metal electrical conductors 23 have different functions, and the metal electrical conductors 23 are different from a wiring line that generally electrically connects a hydrogen evolution electrode and an oxygen evolution electrode to each other.

In addition, the number of metal electrical conductors 23 is not particularly limited, and at least one metal electrical conductor may be sufficient.

Each interval td is a distance in an arrangement direction of the linear metal electrical conductors 23 between facing sides of the metal electrical conductors 23 adjacent to each other in the case of a linear shape. In FIG. 2, each interval td is a distance between facing sides of the linear metal electrical conductors 23 adjacent to each other in the direction D.

In a case where the metal electrical conductors 23 are not linear, the centerlines of the metal electrical conductors 23 are obtained, and a distance between the centerlines is the interval td. The centerline of each metal electrical conductor 23 is a line in which the areas of ranges surrounded by a straight line and the metal electrical conductor 23 are equal to each other between regions that face each other with the straight line interposed therebetween.

Regarding the intervals td, a scanning electron microscope image of the linear metal electrical conductors 23 of the transparent conductive layer 14 is obtained. The intervals td can be obtained by measuring a distance between facing sides of metal wire images adjacent to each other, using the scanning electron microscope image. The scanning electron microscope image may be an image downloaded into a computer, or a hard copy, such as a photograph obtained by imaging.

In addition, the arrangement direction of the linear metal electrical conductors 23 is not limited to the above-described direction D, and may be a direction Dr orthogonal to the direction D. The arrangement direction and the intervals td of the linear metal electrical conductors 23 are appropriately determined according to the value of the electrical resistance of the transparent conductive layer 14.

The linear metal electrical conductors 23 are formed using, for example, a vapor phase growth method, such as a vapor deposition method or a sputtering method. In this case, the linear metal electrical conductors 23 may be formed in a predetermined pattern using a mask or the like. Additionally, processing may be performed in a predetermined pattern to form the linear metal electrical conductors 23, for example, using photolithography, after a solid metal layer to be the linear metal electrical conductors 23 are formed.

The metal conducting wire 25 can be formed in the same manner as the above-described linear metal electrical conductors 23.

The transparent conductive layer 14 illustrated in FIG. 1 is formed, for example, as follows. First, the transparent conductive layer 14 is formed by covering the linear metal electrical conductors 23 and the metal conducting wire 25 on the surface 12a of a substrate 12 with the indium tin oxide (ITO), using the sputtering method, after the linear metal electrical conductors 23 and metal conducting wire 25 are formed on the surface 12a of the substrate 12 as illustrated in FIG. 2, for example, by the vapor phase growth method.

The linear metal electrical conductors 23 are constituted of, for example, Mo, Pt, Ru, Ag, Au, Cu, or Al. Additionally, the linear metal electrical conductors 23 may be constituted of, for example, an alloy of Mo, Pt, Ru, Ag, Au, Cu, or Al.

Similarly to the above-described metal electrical conductors 23, the metal conducting wire 25 may be constituted of, for example, Mo, Pt, Ru, Ag, Au, Cu, or Al, and may be constituted of, for example, an alloy of Mo, Pt, Ru, Ag, Au, Cu, or Al. It is preferable that the metal conducting wire 25 and the metal electrical conductors 23 have the same composition. By forming the metal conducting wire 25 and the metal electrical conductors 23 to have the same composition, the metal conducting wire 25 and the metal electrical conductors 23 can be simultaneously and integrally formed. In addition, the expression "same composition" means that metallic elements are the same as each other in the case of being constituted of single metals, and means that compositions are the same as each other by 80 mass % or more in the case of being constituted of alloys. Additionally, the term "simultaneously" means being formed by the same process, for example, being formed by a single sputtering process.

The electrical resistance of the transparent conductive layer 14 is represented using, for example, sheet resistance. It is preferable that the sheet resistance is 10 Ω/cm or less. In a case where the sheet resistance is 10 Ω/cm or less, the resistance loss of the photocatalyst electrode 10 can be made sufficiently small. In addition, the sheet resistance can be measured using a four-probe method.

In a case where there are many linear metal electrical conductors 23 provided in the transparent conductive layer 14, the amount of light transmitted through the transparent conductive layer 14 decreases. For this reason, in a case where transparency is required for the transparent conductive layer 14, the transmitted light amount can be preferably obtained in a case where the opening ratio of the transparent conductive layer 14 in which the linear metal electrical conductors 23 are provided is 90% or more, and it is sufficient in a case where the opening ratio is 95% or more. The opening ratio is defined as follows.

$$\text{Opening ratio} = (\text{Area of transmittable region})/(\text{Total area of transparent conductive layer}) \times 100$$

Here, the term "transmittable region" is a region that does not have the linear metal electrical conductors 23 in the transparent conductive layer 14, and can be obtained by subtracting the area of the linear metal electrical conductors 23 from the total area of the transparent conductive layer 14.

It is preferable that the metal electrical conductors 23 of the above-described photocatalyst electrode 10 have a taper angle. Additionally, in the metal electrical conductors 23, it is preferable that the length of an upper base is shorter than the length of a lower base.

Specifically, it is preferable that the metal electrical conductors 23 have a taper structure where the surface 12a side of the substrate 12 has a wide taper angle. It is preferable that a cross-sectional shape is a trapezoidal shape in which side faces are planar inclined faces as in a metal electrical conductor 23 illustrated in FIG. 3.

Figure 3:
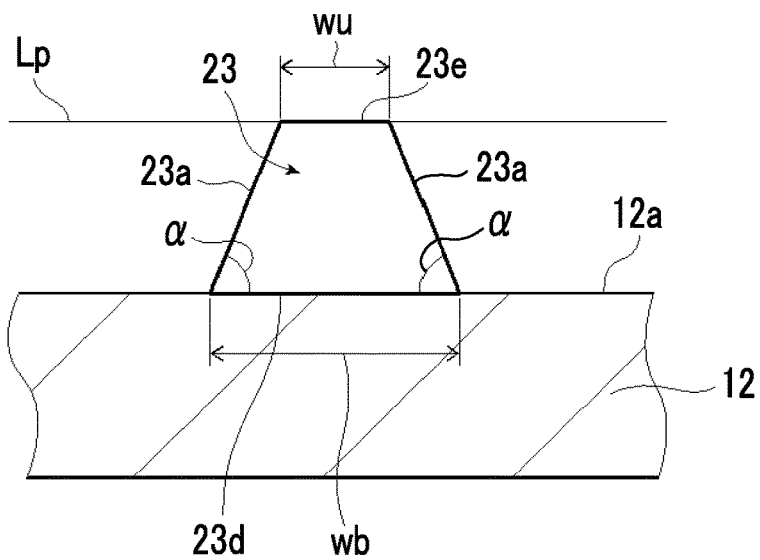
FIG. 3 is a schematic cross-sectional view illustrating a first example of the configuration of a linear metal electrical conductor of the photocatalyst electrode of the embodiment of the invention.

Here, the term "taper" refers to an etching shape in which elevation angle as seen from a base surface, specifically, in FIG. 3, the surface 12a of the substrate 12 is 0° to 90° in the cross-sectional shape of the metal electrical conductor 23.

In this case, the term "lower base" refers to the base surface, and in FIG. 3, a lower face of the metal electrical conductor 23 in contact with the surface 12a of the substrate 12, and is designated by reference numeral 23d. The "upper base" refers to an upper face of the metal electrical conductor 23 that is parallel to the lower base 23d and is not in contact with the base surface, and is designated by reference sign 23e. Moreover, the term "upper side" is defined as protruding from a parallel line Lp (refer to FIG. 3) parallel to the base surface. Accordingly, the upper side can be specified even in a case where the upper side is a slightly convex shape.

In the cross-sectional shape of the metal electrical conductor 23, it is preferable that a length wu of the upper base 23e is shorter than a length wb of the lower base 23d in contact with the surface 12a of the substrate 12. In a case where the length wu of the upper base 23e is shorter than the length wb of the lower base 23d, the cross-sectional shape of the side faces is not particularly limited. The length wu of the upper base 23e illustrated in FIG. 3 is a length in contact with the parallel line Lp parallel to the surface 12a of the substrate 12. For this reason, even in a case where there is a region protruding from the parallel line Lp as described above, the length wu of the upper base is determined by the length in contact with the parallel line Lp.

In addition, in the upper base and the lower base, irregularities on the base surface are inherited, and there are irregularities of several micrometers to several tens of micrometers. In this way, in a case where the base surface has the irregularities, an average surface is used a reference surface.

Additionally, basically, although the upper base and the lower base are parallel to each other, an angle of about 3° is allowed regarding the parallel.

The expression "having a taper angle in the metal electrical conductor 23" is defined by a taper angle α. In a case where the taper angle α of the metal electrical conductor 23 is 90°, the metal electrical conductor 23 has no taper angle. In a case where the taper angle α of the metal electrical conductor 23 is less than 90°, the metal electrical conductor 23 has a taper angle. The taper angle α is preferably 5° or more and 60° or less, and more preferably, 5° or more and 40° or less. In a case where the taper angle α is less than 5°, it is difficult to make the metal electrical conductor 23, and in a case where the taper angle α exceeds 60°, cracking is likely to occur.

The taper angle α is an angle formed by each of side faces 23a of the metal electrical conductor 23 and the surface 12a of the substrate 12. In a case where the side faces 23a of the metal electrical conductor 23 cannot be specified, a tangent line (not illustrated) is drawn in a region equivalent to each side face 23a, and an angle formed between this tangent line and the surface 12a of the substrate 12 is the taper angle α.

The taper angle α of the metal electrical conductor 23 can be measured as follows. First, the scanning electron microscope image including the metal electrical conductors 23 and the substrate 12 is obtained using a scanning electron microscope. Then, side faces 23a of a metal electrical conductor 23 and the surface 12a of the substrate 12 are specified using the scanning electron microscope image including the metal electrical conductors 23 and the substrate 12, and an angle formed between each side face 23a of the metal electrical conductor 23 and the surface 12a of the substrate 12 is measured. In a case where the side faces 23a cannot be specified, the tangent line is drawn as described above and the angle formed between the tangent line and the surface 12a of the substrate 12 is measured.

In addition, the scanning electron microscope image may be an image downloaded into a computer, or a hard copy, such as a photograph obtained by imaging.

Figure 4:
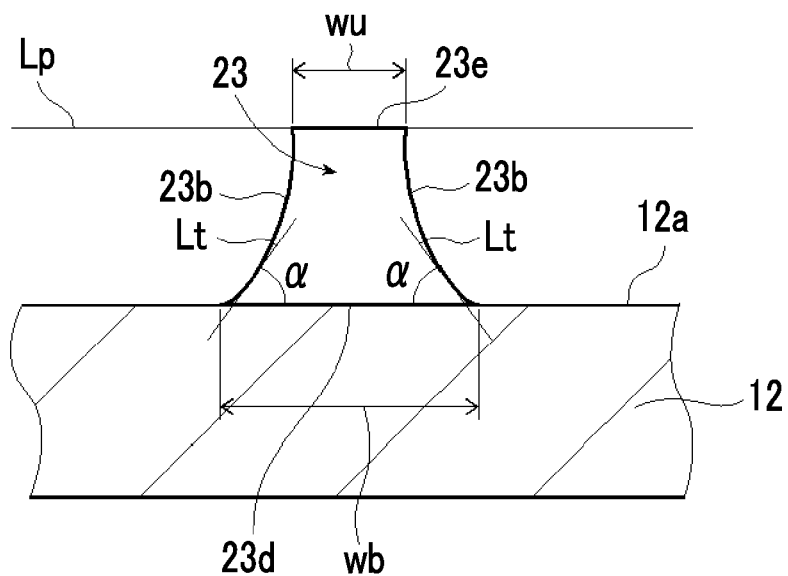
FIG. 4 is a schematic cross-sectional view illustrating a second example of the configuration of the linear metal electrical conductor of the photocatalyst electrode of the embodiment of the invention.

Additionally, in the metal electrical conductor 23, as illustrated in FIG. 4, side face 23b may be curved faces that are concave toward the interior of the metal electrical conductor 23. In this case, the taper angle α is an angle formed between a tangent line Lt with respect to each side face 23b and the surface 12a of the substrate 12.

In this way, the side faces of the metal electrical conductor 23 may be planar faces or curved faces, and a configuration in which a planar face and a curved face are combined together may be adopted.

Figure 5:
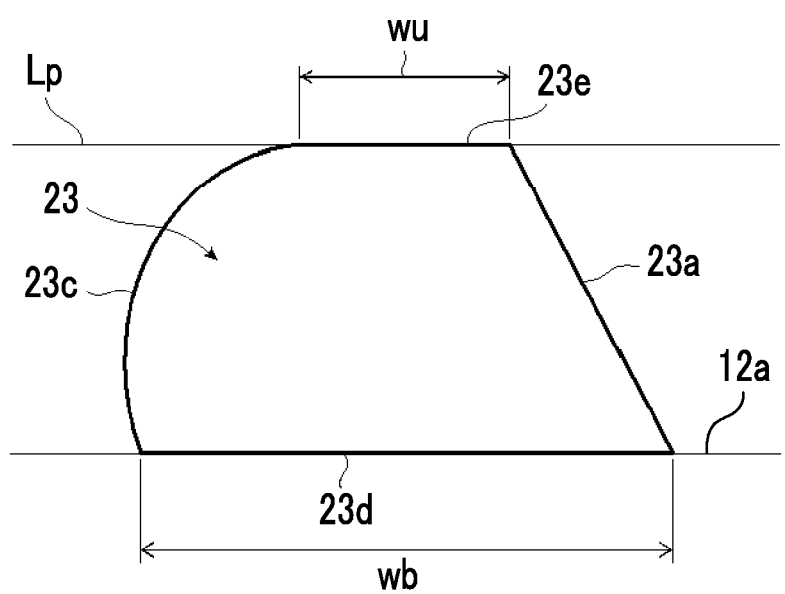
FIG. 5 is a schematic view illustrating a third example of the configuration of the linear metal electrical conductor of the photocatalyst electrode of the embodiment of the invention.

Additionally, as in a cross-sectional shape of the metal electrical conductor 23 illustrated in FIG. 5, a side face 23c may be a curved face that is convex toward the outside of the metal electrical conductor 23. In this way, also on the convex side face 23c, the length wu of the upper base 23e is a length in contact with the parallel line Lp.

Figure 6:
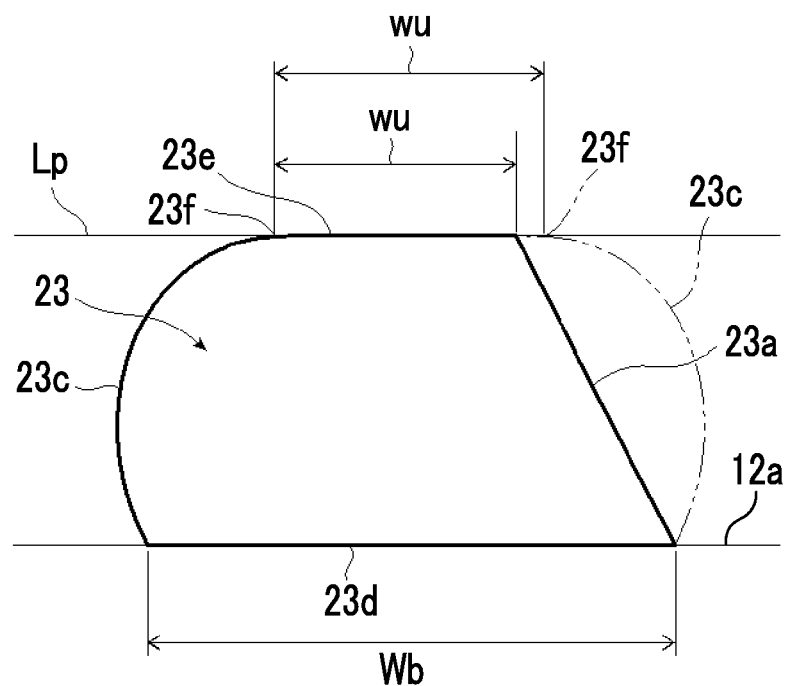
FIG. 6 is a schematic view illustrating a fourth example of the configuration of the linear metal electrical conductor of the photocatalyst electrode of the embodiment of the invention.

In a cross-sectional shape of the metal electrical conductor 23 illustrated in FIG. 6, a portion of a convex side face 23c rises and is in contact with the parallel line Lp. In this case, the length wu of the upper base 23e is a length including points 23f where the parallel line Lp and side faces 23c are in contact with each other. Additionally, in a case where both are convex side faces 23c in the metal electrical conductor 23 illustrated in FIG. 6, the length between points 23f in contact with the parallel line Lp is the length wu of the upper base 23e. In addition, in FIG. 6, one convex side face 23c is illustrated by a two-dot chain line.

Next, a second example of the photocatalyst electrode 10 will be described.

In FIG. 1, the metal electrical conductors 23 are isolated from the water AQ by being buried within the transparent conductive layer 14. However, as long as the metal electrical conductors 23 can be isolated from the water AQ where the photocatalyst electrode 10 is immersed in the water AQ, the isolation form of the metal electrical conductors 23 is not particularly limited.

Figure 7:
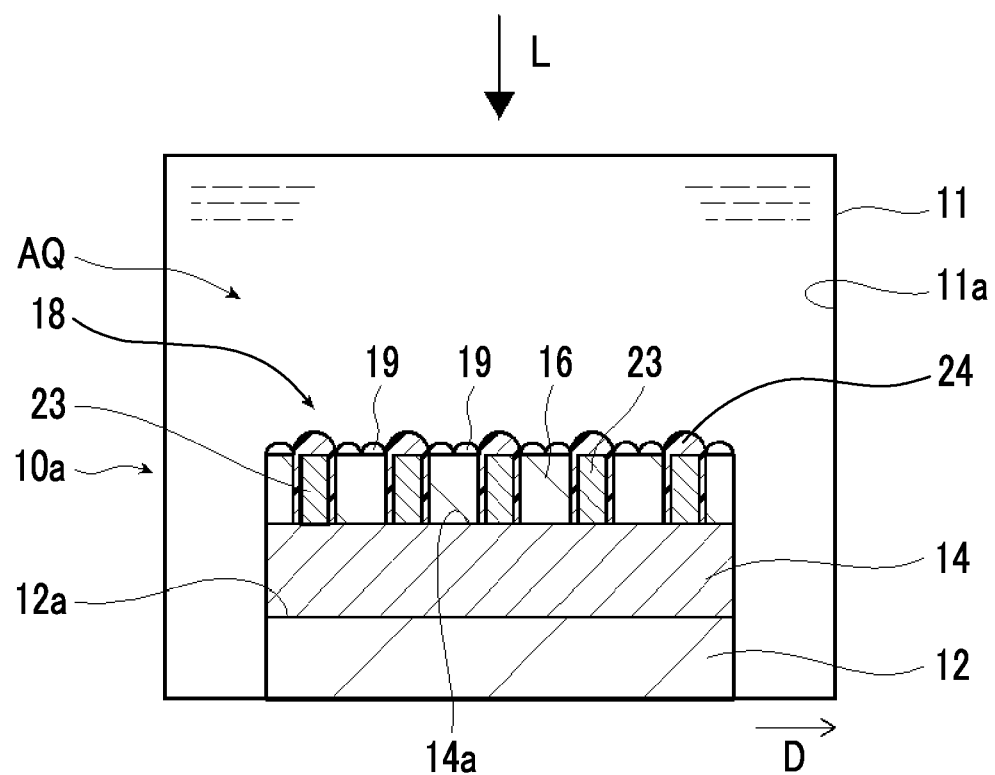
FIG. 7 is a schematic cross-sectional view illustrating a second example of the photocatalyst electrode of the embodiment of the invention.
Figure 8:
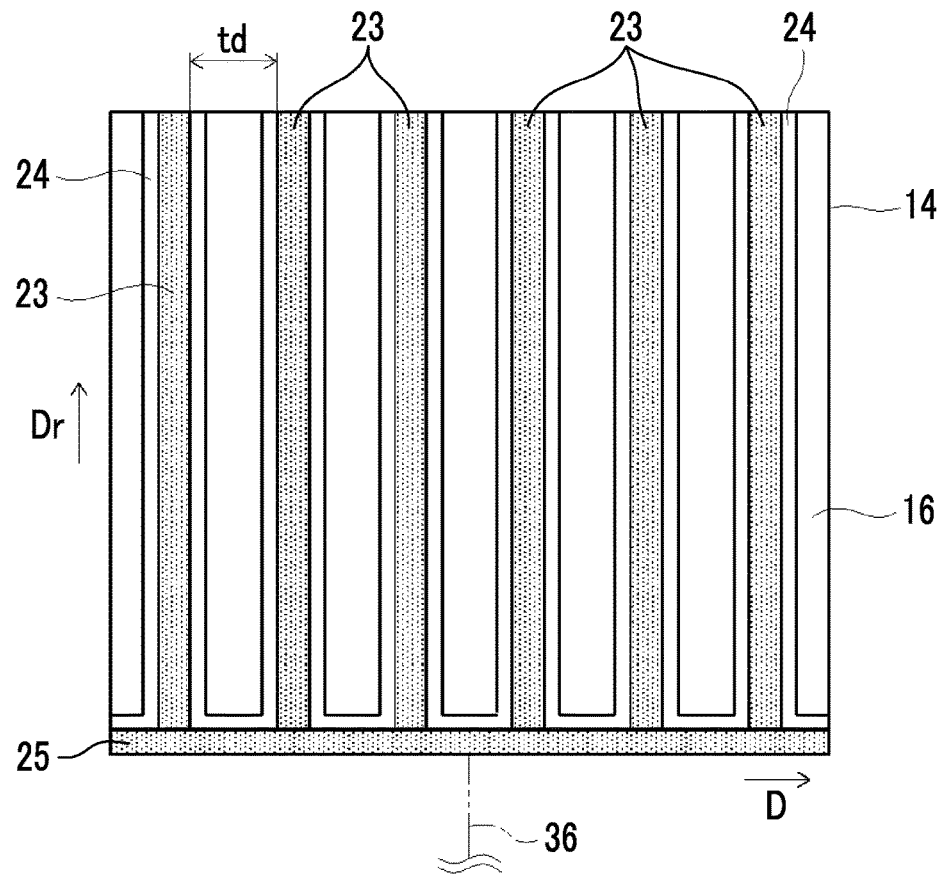
FIG. 8 is a schematic plan view illustrating a conductive layer of the photocatalyst electrode of the second example of the embodiment of the invention.

FIG. 7 is a schematic cross-sectional view illustrating a second example of the photocatalyst electrode of the embodiment of the invention, and FIG. 8 is a schematic plan view illustrating a conductive layer of the photocatalyst electrode of the second example of the embodiment of the invention.

In FIGS. 7 and 8, the same components as those of the photocatalyst electrode 10 illustrated in FIGS. 1 and 2 will be designated by the same reference signs, and the detailed description thereof will be omitted.

In a photocatalyst electrode 10a illustrated in FIGS. 7 and 8, as compared to the photocatalyst electrode 10 (refer to FIG. 1), the arrangement positions of the metal electrical conductors 23 are different, and the metal electrical conductors 23 are not buried within the transparent conductive layer 14, the metal electrical conductors 23 are disposed on a surface 14a of the transparent conductive layer 14 on the photocatalyst layer 16 side in contact with the transparent conductive layer 14. Additionally, in the plurality of metal electrical conductors 23, a protective film 24 is provided on side faces of the respective metal electrical conductors 23 and the surface 14a on the photocatalyst layer 16 side.

The protective film 24 is for isolating the metal electrical conductors 23 from the water AQ. The protective film 24 is formed of, for example, acrylic resin, urethane resin, epoxy resin, or silicone resin. The photocatalyst electrode 10a can obtain the same effects as those the above-described photocatalyst electrode 10. Additionally, the metal conducting wire 25 is also isolated from the water AQ by the protective film 24.

Also in the photocatalyst electrode 10, similarly to the photocatalyst electrode 10a, the number of metal electrical conductors 23 is not particularly limited, and at least one metal electrical conductor may be sufficient.

The photocatalyst electrode 10a illustrated in FIGS. 7 and 8 is formed, for example, as follows. First, and an indium tin oxide (ITO) film is formed as the transparent conductive layer 14 on the surface 12a of the substrate 12, for example, using the sputtering method. Next, the photocatalyst layer 16 is formed on the surface 14a of the transparent conductive layer 14. Next, in the photocatalyst layer 16, a region where the metal electrical conductors 23 are formed, the protective film 24, and metal conducting wire 25 is formed by removal, for example, using laser scribing or mechanical scribing. Next, the linear metal electrical conductors 23 and the metal conducting wire 25 are formed in the above-described region, for example, using an ink jet method. Next, epoxy resin is coated on gaps between the metal electrical conductors 23 and the photocatalyst layer 16, and upper faces of the metal electrical conductors 23 to form the protective film 24. Accordingly, the photocatalyst electrode 10a is formed. Also in the photocatalyst electrode 10a, as described above, it is preferable that the length of the upper base of each metal electrical conductor 23 is shorter than the length of the lower base, and it is preferable that the metal electrical conductor 23 has the taper angle.

In addition, although it is preferable from a viewpoint of specific resistance that the transparent conductive layer 14 is formed as a film by a vacuum film formation method, such as sputtering, the film may be formed using ink or the like in a case where the resistance may be made high.

Although the photocatalyst electrodes 10 and 10a split water to produce gas, the composition of the photocatalyst layer 16 is appropriately set in accordance with the gas to be produced. The gas is, for example, oxygen and hydrogen, and is also available for creation of methane in addition to these. Respective constituent layers of the photocatalyst electrodes 10 and 10a will be described below in detail.

Next, the artificial photosynthesis module using the photocatalyst electrode 10 will be described.

Figure 9:
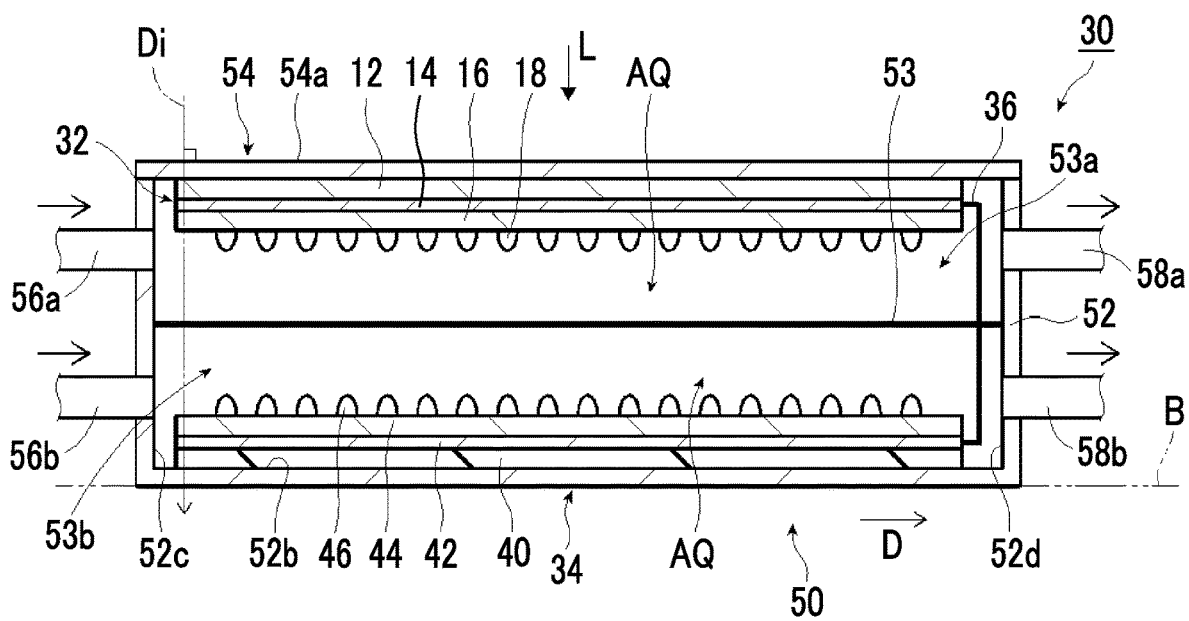
FIG. 9 is a schematic cross-sectional view illustrating a first example of an artificial photosynthesis module of the embodiment of the invention.
Figure 10:
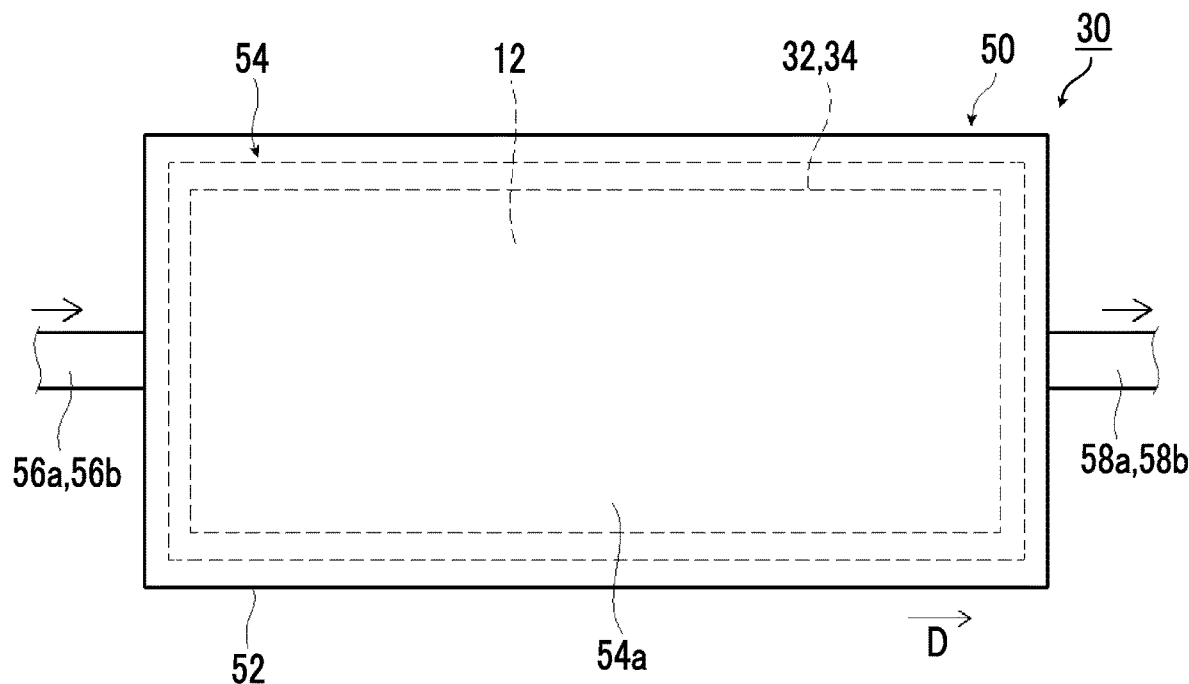
FIG. 10 is a schematic plan view illustrating the first example of the artificial photosynthesis module of the embodiment of the invention.
Figure 11:
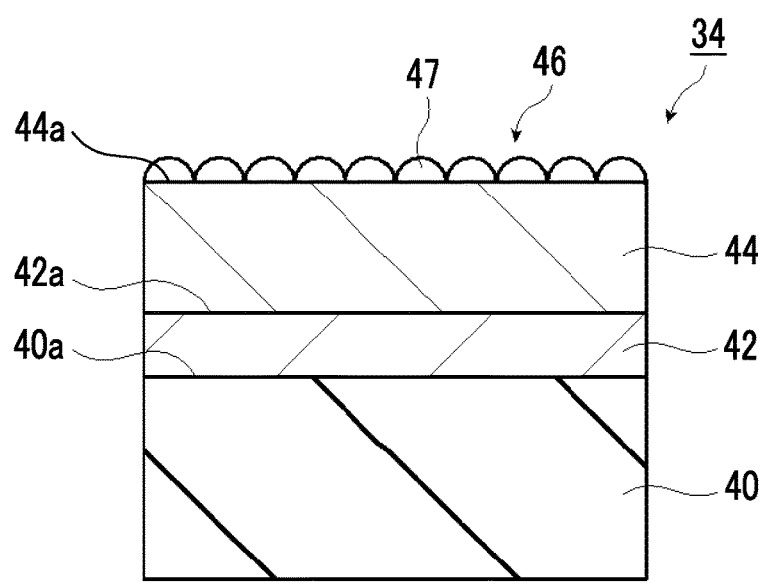
FIG. 11 is a schematic cross-sectional view illustrating an example of a hydrogen evolution electrode.

Here, FIG. 9 is a schematic cross-sectional view illustrating a first example of the artificial photosynthesis module of the embodiment of the invention, and FIG. 10 is a schematic plan view illustrating the first example of the artificial photosynthesis module of the embodiment of the invention. FIG. 11 is a schematic cross-sectional view illustrating an example of the hydrogen evolution electrode.

In addition, in FIGS. 9 to 11, the same components as those of the photocatalyst electrode 10 illustrated in FIGS. 1 and 2 will be designated by the same reference signs, and the detailed description thereof will be omitted.

The artificial photosynthesis module 30 illustrated in FIG. 9 is a two-electrode water-splitting module that splits the water AQ with the light L to produce gas, such as hydrogen and oxygen, and has, for example, an oxygen evolution electrode 32 and a hydrogen evolution electrode 34. The oxygen evolution electrode 32 and the hydrogen evolution electrode 34 are photocatalyst electrodes utilized for splitting of the water AQ in a state where these electrodes are immersed in the water AQ.

The artificial photosynthesis module 30 has, for example, the oxygen evolution electrode 32, the hydrogen evolution electrode 34, and a container 50 that houses the oxygen evolution electrode 32 and the hydrogen evolution electrode 34. The container 50 is disposed, for example, on a horizontal plane B.

The oxygen evolution electrode 32 splits the water AQ to produce oxygen in a state where the oxygen evolution electrode 32 is immersed in the water AQ, and has, for example, a flat plate shape as a whole as illustrated in FIG. 10. For example, the photocatalyst electrode 10 illustrated in FIG. 1 or the photocatalyst electrode 10a illustrated in FIG. 7 is used for the oxygen evolution electrode 32.

The hydrogen evolution electrode 34 splits the water AQ to produce hydrogen in a state where the hydrogen evolution electrode 34 is immersed in the water AQ, and has, for example, a flat plate shape as a whole as illustrated in FIG. 10.

As illustrated in FIG. 9, the container 50 has a housing 52 of which one face is open, and a transparent member 54 that coats the open portion of the housing 52. The diaphragm 53 is provided within the container 50, a first compartment 53a is formed on the transparent member 54 side, and a second compartment 53b is formed on the bottom face 52b side. The light L is, for example, solar light and is incident from the transparent member 54 side. It is preferable that the transparent member 54 also satisfy the specifications of the above-described "transparent".

The oxygen evolution electrode 32 and the hydrogen evolution electrode 34 are electrically connected to each other by, for example, the external conducting wire 36. In addition, the oxygen evolution electrode 32 and the hydrogen evolution electrode 34 are disposed in order of the oxygen evolution electrode 32 and the hydrogen evolution electrode 34 with the diaphragm 53 interposed therebetween within the container 50 in series in a traveling direction Di of the light L. In FIG. 9, the oxygen evolution electrode 32 and the hydrogen evolution electrode 34 are overlappingly disposed parallel to each other with a gap therebetween.

In addition, in a case where the external conducting wire 36 can electrically connect the oxygen evolution electrode 32 and the hydrogen evolution electrode 34 to each other, the configuration thereof is not limited. For example, the same configuration as that of the above-described metal electrical conductors 23 can be adopted.

The two oxygen evolution electrode 32 is disposed in the first compartment 53a. The hydrogen evolution electrode 34 is disposed in the second compartment 53b with a substrate 40 in contact with the bottom face 52b.

In addition, the light L is incident from the transparent member 54 side with respect to the container 50, that is, the light L is incident from the oxygen evolution electrode 32 side. The above-described traveling direction Di of the light L is a direction perpendicular to a surface 54a of the transparent member 54.

An ion-permeable membrane through which produced hydrogen ions permeate but bubbled hydrogen gas and oxygen gas does not permeate is used as the diaphragm 53. For example, Nafion (registered trademark) made by DuPont, SELEMION (registered trademark) made by AGC Engineering CO., LTD., or the like is used as the ion-permeable membrane.

In addition, the diaphragm 53 may not be provided. In a case where the diaphragm 53 is not provided, it is preferable to provide the diaphragm 53 because the oxygen and hydrogen that are produced are recovered together.

In the first compartment 53a, a first wall face 52c is provided with a supply pipe 56a, and a second wall face 52d that faces the first wall face 52c is provided with a discharge pipe 58a. In the second compartment 53b, the first wall face 52c is provided with a supply pipe 56b, and the second wall face 52d that faces the first wall face 52c is provided with a discharge pipe 58b. The water AQ is supplied into the container 50 from the supply pipe 56a and the supply pipe 56b, the interior of the container 50 is filled with the water AQ, the water AQ flows in the direction D, the water AQ containing oxygen is discharged from the discharge pipe 58a, and the oxygen is recovered. From the discharge pipe 58b, the water AQ containing hydrogen is discharged and the hydrogen is recovered.

The direction D is a direction from the first wall face 52c toward the second wall face 52d. In addition, the housing 52 is formed of, for example, an electrical insulating material that does not cause short circuiting or the like in a case where the hydrogen evolution electrode 34 and the oxygen evolution electrode 32 are used. The housing 52 is formed of, for example, acrylic resin.

The oxygen evolution electrode 32 has the same configuration as the photocatalyst electrode 10 illustrated in FIG. 1. It is preferable that the total thickness of the oxygen evolution electrode 32 is about 2 mm.

In the oxygen evolution electrode 32, it is required that the co-catalyst layer 18 is in contact with the photocatalyst layer 16 or is in contact with the water AQ with a layer allowing holes to move therethrough interposed therebetween. In a case where the photocatalyst electrode 10 is used for the oxygen evolution electrode 32, an absorption end of the photocatalyst layer 16 is, for example, about 400 to 800 nm.

Here, the absorption end is a portion or its end where an absorption factor decreases abruptly in a case where the wavelength becomes longer than this in a continuous absorption spectrum, and the unit of the absorption end is nm.

The oxygen evolution electrode 32 allows the light L to be transmitted therethrough in order to make the light L incident on the hydrogen evolution electrode 34. In order to irradiate the hydrogen evolution electrode 34 with the light L, the substrate 12 of the oxygen evolution electrode 32 is transparent. In the hydrogen evolution electrode 34, the substrate 40 does not need to be transparent.

As illustrated in FIG. 9, the light L is incident from the oxygen evolution electrode 32 side, and the photocatalyst layer 16 and the co-catalyst layer 18 of the oxygen evolution electrode 32 is provided on a side opposite to an incidence side of the light L. Since the light L is incident from a back face through the substrate 12 by providing the co-catalyst layer 18 on the side opposite to the incidence side of the light L, a damping effect obtained by the co-catalyst layer 18 can be suppressed. In addition, in the oxygen evolution electrode 32, a configuration in which the co-catalyst layer 18 is provided on the incidence side of the light L may be adopted. In this case, the oxygen evolution electrode 32 has the photocatalyst layer 16, the transparent conductive layer 14, and the substrate 12 in this order from the incidence direction of the light L.

The above-described traveling direction Di of the light L is a direction perpendicular to a surface 54a of the transparent member 54. However, the incidence direction of the light L is a direction that is incident such that the light L passes through the oxygen evolution electrode 32 or the hydrogen evolution electrode 34. A direction parallel to the traveling direction Di is also included in the incidence direction of the light L.

As illustrated in FIGS. 9 and 11, the hydrogen evolution electrode 34 has a substrate 40, a conductive layer 42 provided on a surface 40a of the substrate 40, a photocatalyst layer 44 provided on a surface 42a of the conductive layer 42, and a co-catalyst layer 46 carried and supported on at least a portion of the photocatalyst layer 44. The hydrogen evolution electrode 34 has the photocatalyst layer 44, the conductive layer 42, and the substrate 40 in this order from the incidence direction of the light L, and the co-catalyst layer 46 is provided on the incidence side of the light L. The conductive layer 42 is equivalent to the transparent conductive layer. The absorption end of the photocatalyst layer 44 of the hydrogen evolution electrode 34 is, for example, about 600 to 1300 nm.

The co-catalyst layer 46 is provided on the surface 44a of the photocatalyst layer 44. The co-catalyst layer 46 is constituted of, for example, a plurality of co-catalyst particles 47. Accordingly, a decrease in the quantity of the light L incident on the surface 44a of the photocatalyst layer 44 is suppressed.

In the hydrogen evolution electrode 34, the carriers created in a case where the light L is absorbed are generated, and the water AQ is splitted to produce hydrogen. In the hydrogen evolution electrode 34, as will be described below, it is also preferable to laminate a material having n-type conductivity on the surface 44a of the photocatalyst layer 44 to form a pn junction. Individual components of the hydrogen evolution electrode 34 will be described below in detail.

In the artificial photosynthesis module 30 illustrated in FIG. 9, by supplying the water AQ into the first compartment 53a of the container 50 via the supply pipe 56a, supplying the water AQ into the second compartment 53b of the container 50 via the supply pipe 56b, and making the light L incident from the transparent member 54 side, oxygen is produced in the co-catalyst layer 18 from the oxygen evolution electrode 32, and hydrogen is produced in the co-catalyst layer 46 from the hydrogen evolution electrode 34 due to the light transmitted through the oxygen evolution electrode 32. Then, the water AQ containing the oxygen is discharged from the discharge pipe 58a, and the oxygen is recovered from the water AQ containing the discharged oxygen. Then, the water AQ containing the hydrogen is discharged from the discharge pipe 58b, and the hydrogen is recovered from the water AQ containing the discharged hydrogen.

In the artificial photosynthesis module 30, the oxygen evolution electrode 32 and the hydrogen evolution electrode 34 are disposed in series in the traveling direction Di of the light L, and the water AQ is splitted to produce oxygen in the oxygen evolution electrode 32 on which the light L is first incident. In the hydrogen evolution electrode 34, the light L transmitted through the oxygen evolution electrode 32 is radiated, and the water AQ is splitted to produce hydrogen. In the artificial photosynthesis module 30, oxygen and hydrogen can be obtained in this way. Moreover, in the artificial photosynthesis module 30, by utilizing the light L in the oxygen evolution electrode 32 and the hydrogen evolution electrode 34, the utilization efficiency of the light L can be made high and the reaction efficiency is high. That is, the current density showing the water splitting can be made high.

Additionally, in the artificial photosynthesis module 30, the reaction efficiency can be made high without increasing the installation area of the oxygen evolution electrode 32 and the hydrogen evolution electrode 34.

In the artificial photosynthesis module 30, as described above, the absorption end of the photocatalyst layer 16 of the oxygen evolution electrode 32 is, for example, about 500 to 800 nm, and the absorption end of the photocatalyst layer 44 of the hydrogen evolution electrode 34 is, for example, about 600 to 1300 nm.

Here, in a case where an absorption end of the photocatalyst layer 16 of the oxygen evolution electrode 32 is defined as $\lambda_1$ and an absorption end of the photocatalyst layer 44 of the hydrogen evolution electrode 34 is defined as $\lambda_2$, it is preferable that $\lambda_1 < \lambda_2$ and $\lambda_2 - \lambda_1 \geq 100$ nm are satisfied. Accordingly, in a case where the light L is solar light, even in a case where light having a specific wavelength is previously absorbed by the photocatalyst layer 16 of the oxygen evolution electrode 32 and is utilized for evolution of oxygen, the light L can be absorbed by the photocatalyst layer 44 of the hydrogen evolution electrode 34 and can be utilized for evolution of hydrogen, and a required carrier creation amount is obtained in the hydrogen evolution electrode 34. Accordingly, the utilization efficiency of the light L can be further enhanced.

Moreover, as described above, even in a case where the photocatalyst electrode 10 is enlarged, an increase in electrical resistance can be suppressed, and a high current density can be obtained.

In addition, in a case where the hydrogen evolution electrode 34 and the oxygen evolution electrode 32 are electrically connected to each other, a connection form is not particularly limited and is not limited to the external conducting wire 36. Additionally, the hydrogen evolution electrode 34 and the oxygen evolution electrode 32 may be electrically connected to each other, and a connection method is not particularly limited.

In addition, in the artificial photosynthesis module 30, an absorption end of the hydrogen evolution electrode 34 is about 500 to 800 nm, an absorption end of the oxygen evolution electrode 32 is 600 to 1300 nm, and the photocatalyst electrode 10 including the transparent conductive layer 14 including the above-described metal electrical conductors 23 may be used for the hydrogen evolution electrode 34.

Figure 12:
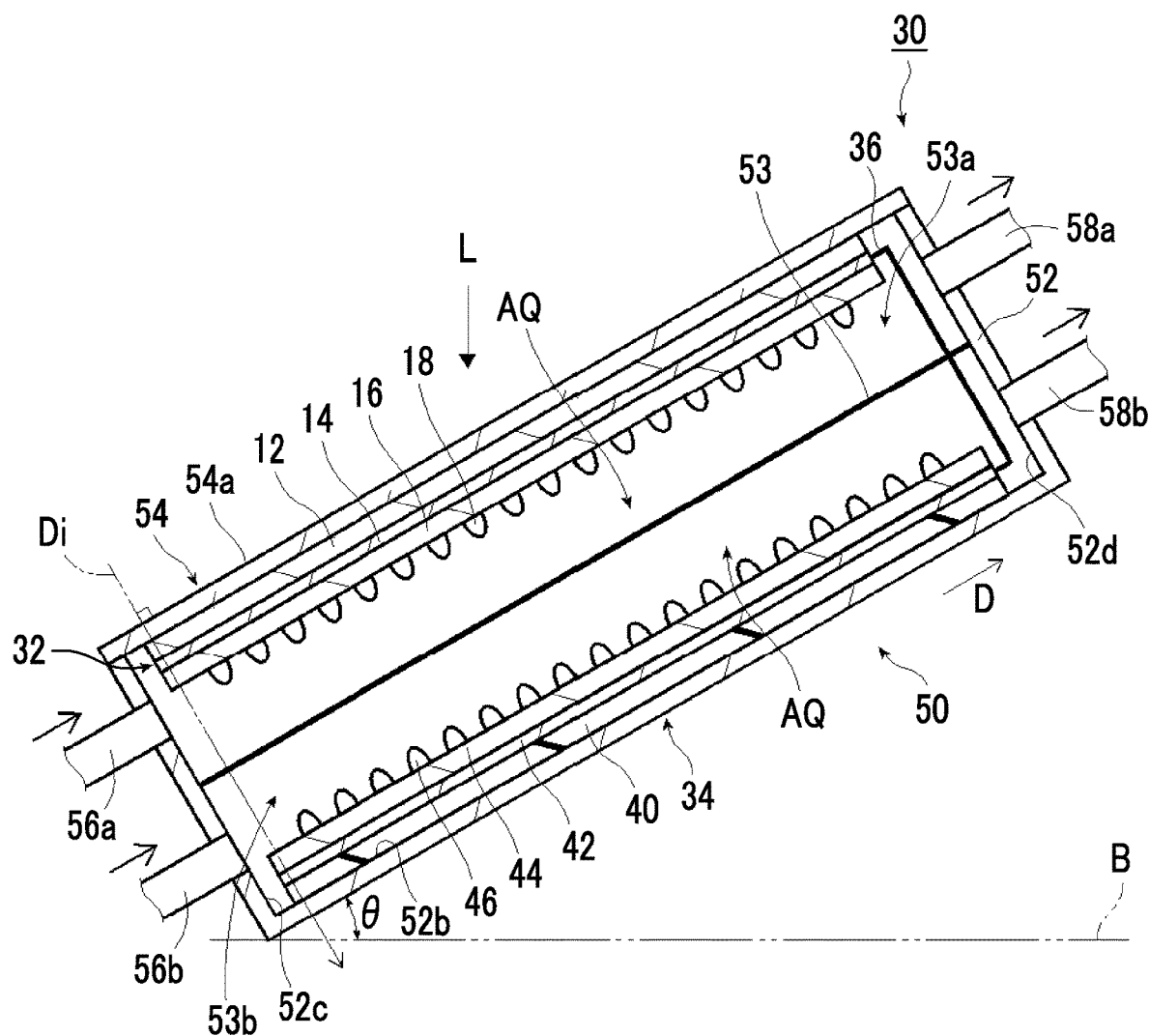
FIG. 12 is a schematic cross-sectional view illustrating a second example of the artificial photosynthesis module of the embodiment of the invention.

Additionally, in the artificial photosynthesis module 30, the container 50 is disposed on the horizontal plane B in FIG. 9, but may be disposed to incline at a predetermined angle θ with respect to the horizontal plane B as illustrated in FIG. 12. In this case, as compared to the supply pipe 56a and the supply pipe 56b, the discharge pipe 58a and the discharge pipe 58b become high, and the produced oxygen and hydrogen are easily recovered. Additionally, the produced oxygen can be rapidly moved from the oxygen evolution electrode 32, and the produced hydrogen can be rapidly moved from the hydrogen evolution electrode 34. Accordingly, stagnation of the produced oxygen and hydrogen in the form of bubbles is suppressed, and blocking of the light L by the bubbles is suppressed. For this reason, the influence on the reaction efficiency of the produced oxygen and hydrogen can be reduced.

As illustrated in FIG. 12, in a case where the inclination is made at the angle θ with respect to the horizontal plane B, the light L is not incident perpendicularly to the surface 54a of the transparent member 54. However, in the oxygen evolution electrode 32, the co-catalyst layer 18 is provided on the side opposite to the incidence side of the light L and the substrate 12. Also in the artificial photosynthesis module 30 inclined at the angle θ illustrated in FIG. 12, the traveling direction Di of the light L is made the same as that in FIG. 1.

Figure 13:
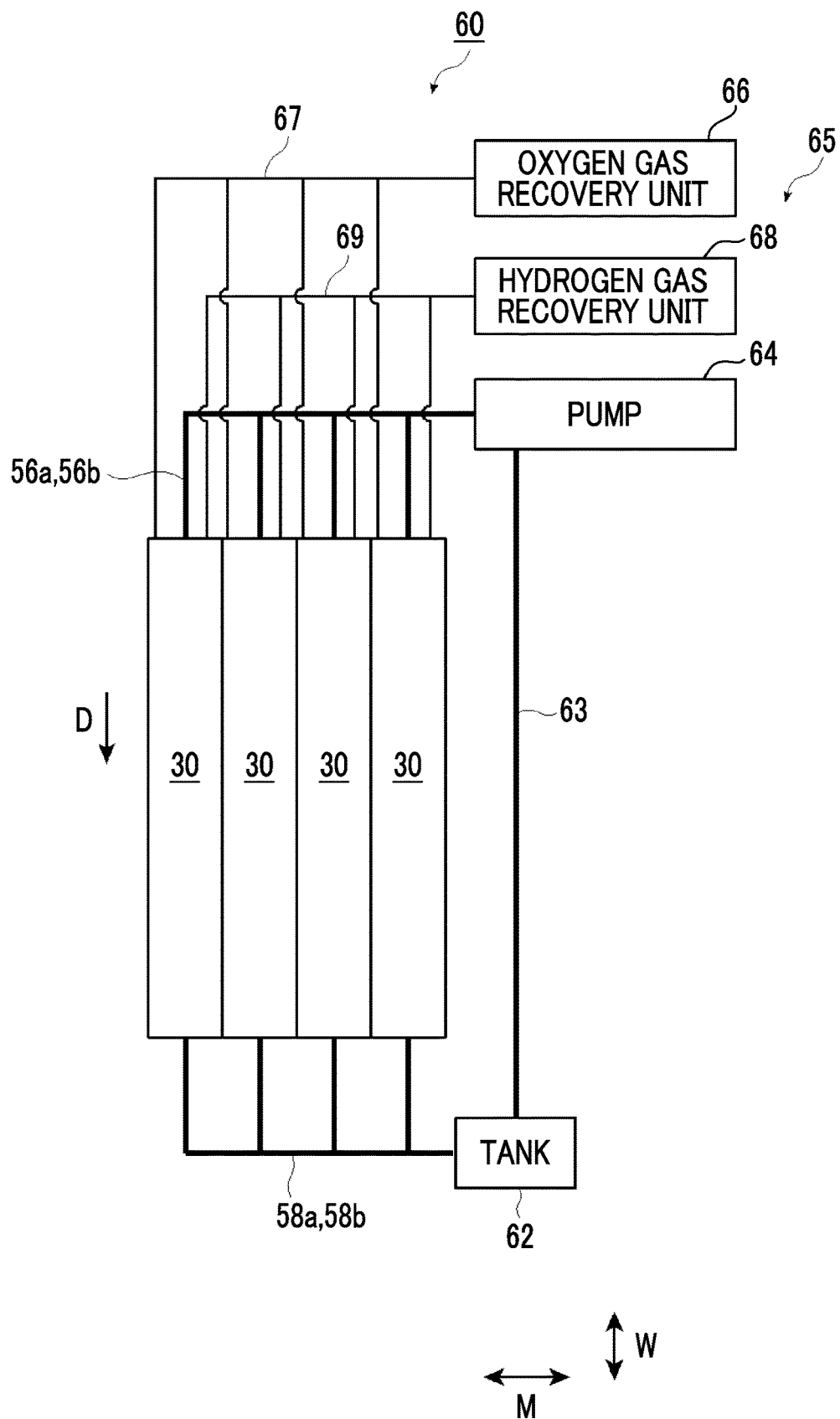
FIG. 13 is a schematic view illustrating the artificial photosynthesis device of the embodiment of the invention.

The above-described artificial photosynthesis module 30 can be utilized for the artificial photosynthesis device. FIG. 13 is a schematic view illustrating the artificial photosynthesis device of the embodiment of the invention.

An artificial photosynthesis device 60 illustrated in FIG. 13 has an artificial photosynthesis module 30 that splits water to produce gas, a tank 62 that stores water, supply pipes 56a and 56b that are connected to the tank 62 and the artificial photosynthesis module 30 and supply water to the artificial photosynthesis module 30, discharge pipes 58a and 58b that are connected to the tank 62 and the artificial photosynthesis module and recover water from the artificial photosynthesis module, a pump 64 that circulates water between the tank 62 and the artificial photosynthesis module 30 via the supply pipes 56a and 56b and the discharge pipes 58a and 58b, and a gas recovery unit 65 that recovers the gas produced in the artificial photosynthesis module 30.

In the artificial photosynthesis device 60, a plurality of the artificial photosynthesis module 30 are disposed with the direction D and a direction W being made parallel to each other, and are disposed side by side in a direction M orthogonal to a direction W. Since the configuration of each artificial photosynthesis module 30 is the same as the configuration illustrated in FIG. 9, the detailed description thereof will be omitted. The number of artificial photosynthesis modules 30 is not particularly limited as long as the plurality of artificial photosynthesis modules are provided, and at least two artificial photosynthesis modules may be provided.

The tank 62 stores water as described above, stores the water to be supplied to the artificial photosynthesis modules 30, and also stores the water discharged through the discharge pipes 58a and 58b from the artificial photosynthesis modules 30. The tank 62 is not particularly limited as long as the tank 62 can store water.

The pump 64 is connected to the tank 62 via a pipe 63, and supplies the water stored in the tank 62 to the artificial photosynthesis modules 30. The pump 64 also supplies the water that is discharged from the artificial photosynthesis modules 30 to the tank 62 and stored in the artificial photosynthesis modules 30. In this way, the pump 64 circulates water between the tank 62 and the artificial photosynthesis modules 30 via the supply pipes 56a and 56b and the discharge pipes 58a and 58b. As long as the pump 64 can circulate water between the tank 62 and the artificial photosynthesis modules 30, the pump 64 is not particularly limited, and is appropriately selected on the basis of the amount of the water to be circulated, the pipe length, or the like.

The gas recovery unit 65 has an oxygen gas recovery unit 66 that recovers the oxygen gas created in the artificial photosynthesis modules 30, and a hydrogen gas recovery unit 68 that recovers the hydrogen gas created in the artificial photosynthesis modules 30.

The oxygen gas recovery unit 66 is connected to the artificial photosynthesis modules 30 via a pipe 67 for oxygen. The configuration of the oxygen gas recovery unit 66 is not particularly limited as long as the oxygen gas recovery unit 66 can recover the oxygen gas. For example, devices using an adsorption method are available.

The hydrogen gas recovery unit 68 is connected to the artificial photosynthesis modules 30 via a pipe 69 for hydrogen. The configuration of the hydrogen gas recovery unit 68 is not particularly limited as long as hydrogen gas recovery unit 68 can recover the hydrogen gas. For example, devices using an adsorption method, a diaphragm method, and the like are available.

In the artificial photosynthesis device 60, the artificial photosynthesis modules 30 may be inclined with respect to the direction W. In this case, a form of the artificial photosynthesis module 30 illustrated in FIG. 12 is obtained. By inclining the artificial photosynthesis modules 30, water is likely to move to the tank 62 side. As a result, the creation efficiency of the oxygen gas and the hydrogen gas can be made high. Moreover, the oxygen gas produced in the artificial photosynthesis device 60 is likely to move toward the pipe 67 for oxygen, and the hydrogen gas produced in the artificial photosynthesis device 60 is likely to move toward the pipe 69 for hydrogen. As a result, the oxygen gas and the hydrogen gas can be efficiently recovered.

In addition, although the hydrogen gas recovery unit 68 and the oxygen gas recovery unit 66 are provided on the pump 64 side, the invention is not limited to this, and the hydrogen gas recovery unit 68 and the oxygen gas recovery unit 66 may be provided on the tank 62 side.

Hereinafter, the oxygen evolution electrode 32 and the hydrogen evolution electrode 34 will be described.

First, photocatalyst layers and co-catalysts suitable for the oxygen evolution electrode 32 will be described. The oxygen evolution electrode 32 can be constituted of the above-described photocatalyst electrode 10 or photocatalyst electrode 10a, and photocatalyst layers and co-catalysts that are shown below can also be used for the photocatalyst electrode 10 and the photocatalyst electrode 10a.

<Photocatalyst Layer of Oxygen Evolution Electrode>

As optical semiconductors constituting the photocatalyst layers, well-known photocatalysts may be used, and optical semiconductors containing at least one kind of metallic element are used.

Among these, from a viewpoint of more excellent onset potential, higher photocurrent density, or more excellent durability against continuous irradiation, as metallic elements, Ti, V, Nb, Ta, W, Mo, Zr, Ga, In, Zn, Cu, Ag, Cd, Cr, or Sn is preferable, and Ti, V, Nb, Ta, or W is more preferable.

Additionally, the optical semiconductors include oxides, nitrides, oxynitrides, sulfides, selenides, and the like, which contain the above metallic elements. Additionally, the optical semiconductors are usually contained as a main component in the photocatalyst layers. The main component means that the optical semiconductors are equal to or more than 80% by mass with respect to the total mass of the second photocatalyst layer, and preferably equal to or more than 90% by mass. Although an upper limit of the main component is not particularly limited, the upper limit is 100% by mass.

Specific examples of the optical semiconductors may include, for example, oxides, such as $Bi_2WO_6$, $BiVO_4$, $BiYWO_6$, $In_2O_3(ZnO)_3$, $InTaO_4$, and $InTaO_4$:Ni ("optical semiconductor: M" shows that the optical semiconductors are doped with M. The same applies below), $TiO_2$:Ni, $TiO_2$:Ru, $TiO_2$Rh, and $TiO_2$:Ni/Ta ("optical semiconductor: M1/M2" shows that the optical semiconductors are doped with M1 and M2. The same applies below), $TiO_2$:Ni/Nb, $TiO_2$:Cr/Sb, $TiO_2$:Ni/Sb, $TiO_2$:Sb/Cu, $TiO_2$:Rh/Sb, $TiO_2$:Rh/Ta, $TiO_2$:Rh/Nb, $SrTiO_3$:Ni/Ta, $SrTiO_3$:Ni/Nb, $SrTiO_3$:Cr, $SrTiO_3$:Cr/Sb, $SrTiO_3$:Cr/Ta, $SrTiO_3$:Cr/Nb, $SrTiO_3$:Cr/W, $SrTiO_3$:Mn, $SrTiO_3$:Ru, $SrTiO_3$:Rh, $SrTiO_3$:Rh/Sb, $SrTiO_3$:Ir, $CaTiO_3$:Rh, $La_2Ti_2O_7$:Cr, $La_2Ti_2O_7$:Cr/Sb, $La_2Ti_2O_7$:Fe, $PbMoO_4$:Cr, $RbPb_2Nb_3O_{10}$, $HPb_2Nb_3O_{10}$, $PbBi_2Nb_2O_9$, $BiVO_4$, $BiCu_2VO_6$, $BiSn_2VO_6$, $SnNb_2O_6$, $AgNbO_3$, $AgVO_3$, $AgLi_{1/3}Ti_{2/3}O_2$, $AgLi_{1/3}Sn_{2/3}O_2$, $WO_3$, $BaBi_{1-x}In_xO_3$, $BaZr_{1-x}Sn_xO_3$, $BaZr_{1-x}Ge_xO_3$, and $BaZr_{1-x}Si_xO_3$, oxynitrides, such as $LaTiO_2N$, $Ca_{0.25}La_{0.75}TiO_{2.25}N_{0.75}$, TaON, $CaNbO_2N$, $BaNbO_2N$, $CaTaO_2N$, $SrTaO_2N$, $BaTaO_2N$, $LaTaO_2N$, $Y_2Ta_2O_5N_2$, $(Ga_{1-x}Zn_x)(N_{1-x}O_x)$, $(Zn_{1+x}Ge)(N_2O_x)$ (x represents a numerical value of 0 to 1), and $TiN_xO_yF_z$, nitrides, such as NbN and $Ta_3N_5$, sulfides, such as CdS, selenide, such as CdSe, oxysulfide compounds Chemistry Letters, 2007, 36, 854 to 855) including $Ln_2Ti_2S_2O_5$ (Ln: Pr, Nd, Sm, Gd, Tb, Dy, Ho, and Er), La, and In, the optical semiconductors are not limited to the materials exemplified here.

Among these, as the optical semiconductors, $BaBi_{1-x}In_xO_3$, $BaZr_{1-x}Sn_xO_3$, $BaZr_{1-x}Ge_xO_3$, $BaZr_{1-x}Si_xO_3$, NbN, $TiO_2$, $WO_3$, TaON, $BiVO_4$, or $Ta_3N_5$, $AB(O, N)_3$ {A=Li, Na, K, Rb, Cs, Mg, Ca, Sr, Ba, La, or Y, B=Ta, Nb, Sc, Y, La, or Ti} having a perovskite structure; solid solutions including $AB(O, N)_3$ having the above-described perovskite structure as a main component; or doped bodies including TaON, $BiVO_4$, $Ta_3N_5$, or $AB(O, N)_3$ having the perovskite structure as a main component are preferable.

The shape of the optical semiconductors included in the photocatalyst layers are not particularly limited, and include a film shape, a columnar shape, a particle shape, and the like.

In a case where the optical semiconductors are particulate, the particle diameter of primary particles thereof is not particularly limited. However, usually, the particle diameter is preferably 0.01 μm or more, and more preferably, 0.1 μm or more, and usually, the particle diameter is preferably 10 μm or less and more preferably, 2 μm or less.

The above-described particle diameter is an average particle diameter, and is obtained by measuring the particle diameters (diameters) of any 100 optical semiconductors observed by a transmission electron microscope or a scanning electron microscope and arithmetically averaging these particle diameters. In addition, major diameters are measured in a case where the particle shape is not a true circle.

In a case where the optical semiconductors are columnar, it is preferable that the columnar optical semiconductors extend in a normal direction of the surface of the conductive layer. Although the diameter of the columnar optical semiconductors is particularly limited, usually, the diameter is preferably 0.025 μm or more, and more preferably, 0.05 μm or more, and usually, the diameter is preferably 10 μm or less and more preferably, 2 μm or less.

The above-described diameter is an average diameter and is obtained by measuring the diameters of any 100 columnar optical semiconductors observed by the transmission electron microscope (Device name: H-8100 of Hitachi High Technologies Corporation) or the scanning electron microscope (Device name: SU-8020 type SEM of Hitachi High Technologies Corporation) and arithmetically averaging the diameters.

Although the thickness of the photocatalyst layers is not particularly limited, in the case of an oxide or a nitride, it is preferable that the thickness is 300 nm or more and 2 μm or less. In addition, the optimal thickness of the photocatalyst layers is determined depending on the penetration length of the light L or the diffusion length of excited carriers.

Here, in many materials of the photocatalyst layers containing $BiVO_4$ used well as a material of the photocatalyst layers, the reaction efficiency is not the maximum at such a thickness that all light having absorbable wavelengths can be utilized. In a case where the thickness is large, it is difficult to transport the carriers generated in a location distant from a film surface without deactivating the carriers up to the film surface, due to the problems of the lifespan and the mobility of the carriers. For that reason, even in a case where the film thickness is increased, an expected electric current cannot be taken out.

Additionally, in a particle transfer electrode that is used well in a particle system, the larger the particle diameter, the rougher the electrode film becomes. As the thickness, that is, the particle diameter increases, the film density decreases, and an expected electric current cannot be taken out. The electric current can be taken out in a case where the thickness of the photocatalyst layers is 300 nm or more and 2 μm or less.

By acquiring a scanning electron microscope image of a cross-sectional state of a photocatalyst electrode, the thickness of the photocatalyst layers can be obtained from the acquired image.

The above-described method for forming the photocatalyst layers is not particularly limited, and well-known methods (for example, a method for depositing particulate optical semiconductors on a substrate) can be adopted. The formation methods include, specifically, vapor phase film formation methods, such as an electron beam vapor deposition method, a sputtering method, and a chemical vapor deposition (CVD) method; a transfer method described in Chem. Sci., 2013, 4, and 1120 to 1124; and a method described in Adv. Mater., 2013, 25, and 125 to 131.

In addition, the other layer, for example, an adhesive layer may be included between a substrate and a photocatalyst layer as needed.

<Co-Catalyst of Oxygen Evolution Electrode>

As the co-catalysts, noble metals and transition metal oxides are used. The co-catalysts are carried and supported using a vacuum vapor deposition method, a sputtering method, an electrodeposition method, and the like. In a case where the co-catalysts are formed with a set film thickness of, for example, about 1 to 5 nm, the co-catalysts are not formed as films but become island-like.

As the co-catalysts, for example, single substances constituted of Pt, Pd, Ni Au, Ag, Ru Cu, Co, Rh, Ir, Mn, Fe, or the like, alloys obtained by combining these single substances, and oxides and hydroxides of these single substances, for example, FeOx, CoOx such as CoO, NiOx, $RuO_2$, CoOOH, FeOOH, NiOOH, and RuOOH, may be used.

Next, the conductive layer 42, the photocatalyst layer 44, and the co-catalyst layer 46 of the hydrogen evolution electrode 34 will be described. In addition, the photocatalyst layer 44 and the co-catalyst layer 46 of the hydrogen evolution electrode 34 to be described below can be utilized for the photocatalyst layer 16 and the co-catalyst layer 18 of the photocatalyst electrodes 10 and 10a.

The substrate 40 of the hydrogen evolution electrode 34 illustrated in FIG. 11 supports the photocatalyst layer 44, and is configured to have an electrical insulating property. Although the substrate 40 is not particularly limited, for example, a soda lime glass substrate or a ceramic substrate can be used. Additionally, a substrate in which an insulating layer is formed on a metal substrate can be used as the substrate 40. Here, as the metal substrate, a metal substrate, such as an Al substrate or a steel use stainless (SUS) substrate, or a composite metal substrate, such as a composite Al substrate formed of a composite material of Al, and for example, other metals, such as SUS, is available. In addition, the composite metal substrate is also a kind of the metal substrate, and the metal substrate and the composite metal substrate are collectively and simply referred to as the metal substrate. Moreover, a metal substrate with an insulating film having an insulating layer formed by anodizing a surface of the Al substrate or the like can also be used as the substrate 40. The substrate 40 may be flexible or may not be flexible. In addition, in addition to the above-described substrates, for example, glass plates, such as high strain point glass and non-alkali glass, or a polyimide material can also be used as the substrate 40.

The thickness of the substrate 40 is not particularly limited, may be about 20 to 2000 μm, is preferably 100 to 1000 μm, and is more preferably 100 to 500 μm. In addition, in a case where one including copper indium gallium (di) selenide (CIGS) compound semiconductors is used as the photocatalyst layer 44, photoelectric conversion efficiency is improved in a case where alkali ions (for example, sodium (Na) ions: Na+) are supplied to the substrate 40 side. Thus, it is preferable to provide an alkali supply layer that supplies the alkali ions to the surface 40a of the substrate 40. In addition, in a case where an alkali metal is included in the constituent elements of the substrate 40, the alkali supply layer is unnecessary.

<Conductive Layer of Hydrogen Evolution Electrode>

The conductive layer 42 traps and transports the carriers generated in the photocatalyst layer 44. Although the conductive layer 42 is not particularly limited as long as the conductive layer has conductivity, the conductive layer 42 is formed of, for example, metals, such as Mo, Cr, and W, or combinations thereof. The conductive layer 42 may have a single-layer structure, or may have a laminate structure, such as a two-layer structure. Among these, it is preferable that the conductive layer 42 is formed of Mo. It is preferable that the conductive layer 42 has a thickness of 200 to 1000 nm.

<Photocatalyst Layer of Hydrogen Evolution Electrode>

The photocatalyst layer 44 generates carriers by light absorption, and a conduction band lower end thereof is closer to a base side than a redox potential ($H_2/H^+$) at which water is splitted to produce hydrogen. Although the photocatalyst layer 44 has p-type conductivity of generating holes and transporting the holes to the conductive layer 42, it is also preferable to laminate a material having n-type conductivity on the surface 44a of the photocatalyst layer 44 to form a pn junction. The thickness of the photocatalyst layer 44 is preferably 500 to 3000 nm.

The optical semiconductors constituting one having p-type conductivity are optical semiconductors containing at least one kind of metallic element. Among these, from a viewpoint of more excellent onset potential, higher photocurrent density, or more excellent durability against continuous irradiation, as metallic elements, Ti, V, Nb, Ta, W, Mo, Zr, Ga, In, Zn, Cu, Ag, Cd, Cr, or Sn is preferable, and Ga, In, Zn, Cu, Zr, or Sn is more preferable.

Additionally, the optical semiconductors include oxides, nitrides, oxynitrides, (oxy)chalcogenides, and the like including the above-described metallic elements, and is preferably constituted of GaAs, GaInP, AlGaInP, CdTe, CuInGaSe, CIGS compound semiconductors having a chalcopyrite crystal structure, or CZTS compound semiconductors, such as $Cu_2ZnSnS_4$.

It is particularly preferable that the optical semiconductors are constituted of the CIGS compound semiconductors having a chalcopyrite crystal structure or the CZTS compound semiconductors, such as $Cu_2ZnSnS_4$.

The CIGS compound semiconductor layer may be constituted of $CuInSe_2$ (CIS), $CuGaSe_2$ (CGS), or the like as well as $Cu(In, Ga)Se_2$ (CIGS). Moreover, the CIGS compound semiconductor layer is may be configured by substituting all or part of Se with S.

In addition, as methods for forming the CIGS compound semiconductor layer, 1) a multi-source vapor deposition method, 2) a selenide method, 3) a sputtering method, 4) a hybrid sputtering method, 5) a mechanochemical process method, and the like are known.

Other methods for forming the CIGS compound semiconductor layer include a screen printing method, a proximity sublimating method, a metal organic chemical vapor deposition (MOCVD) method, a spraying method (wet film formation method), and the like. For example, in the screen printing method (wet film formation method), the spraying method (wet film formation method), or the like, crystal having a desired composition can be obtained by forming a particulate film including an 11 group element, a 13 group element, and a 16 group element on a substrate, and executing thermal decomposition processing (may be thermal decomposition processing in a 16 group element atmosphere in this case) or the like (JP1997-74065A (JP-H09-74065A), JP1997-74213A (JP-H09-74213A), or the like). Hereinafter, the CIGS compound semiconductor layer is also simply referred to as a CIGS layer.

In a case where the material having n-type conductivity is laminated on the surface 44a of the photocatalyst layer 44 as described above, the pn junction is formed.

It is preferable that the material having n-type conductivity is formed of one including metal sulfide including at least one kind of metallic element selected from a group consisting of, for example, Cd, Zn, Sn, and In, such as CdS, ZnS, Zn(S, O), and/or Zn (S, O, OH), SnS, Sn(S, O), and/or Sn(S, O, OH), InS, In (S, O), and/or In (S, O, OH). It is preferable that the film thickness of a layer of the material having n-type conductivity is 20 to 100 nm. The layer of the material having n-type conductivity is formed by, for example, a chemical bath deposition (CBD) method.

The configuration of the photocatalyst layer 44 is not particularly limited as long as the photocatalyst layer 44 is formed of inorganic semiconductors, can cause a photolysis reaction of water, and can produce hydrogen.

For example, photoelectric conversion elements used for solar battery cells that constitute a solar battery are preferably used. As such photoelectric conversion elements, in addition to those using the above-described CIGS compound semiconductors or CZTS compound semiconductors such as $Cu_2ZnSnS_4$, thin film silicon-based thin film type photoelectric conversion elements, CdTe-based thin film type photoelectric conversion elements, dye-sensitized thin film type photoelectric conversion elements, or organic thin film type photoelectric conversion elements can be used.

<Co-Catalyst of Hydrogen Evolution Electrode>

As the co-catalyst layer 46, it is preferable that, for example, Pt, Pd, Ni, Ag, Ru, Cu, Co, Rh, Ir, Mn, and $RuO_2$ are used.

A transparent conductive layer (not illustrated) may be provided between the photocatalyst layer 44 and the co-catalyst layer 46. The transparent conductive layer needs a function of electrically connecting the photocatalyst layer 44 and the co-catalyst layer 46 to each other, transparency, water resistance, and water impermeability are also required for the transparent conductive layer, and the durability of the hydrogen evolution electrode 34 is improved by the transparent conductive layer.

It is preferable that the transparent conductive layer is formed of, for example, metals, conductive oxides (of which the overpotential is equal to or lower than 0.5 V), or composites thereof. The transparent conductive layer is appropriately selected in conformity with the absorption wavelength of the photocatalyst layer 44. Transparent conductive films formed of ZnO that is doped with indium tin oxide (ITO), fluorine-doped tin oxide (FTO), Al, B, Ga, In, or the like, or IMO ($In_2O_3$ doped with Mo) can be used for the transparent conductive layer. The transparent conductive layer may have a single-layer structure, or may have a laminate structure, such as a two-layer structure. Additionally, the thickness of the transparent conductive layer is not particularly limited, and is preferably 30 to 500 nm.

In addition, although methods for forming the transparent conductive layer are not particularly limited, a vacuum film deposition method is preferable. The transparent conductive layer can be formed by vapor phase film formation methods, such as an electron beam vapor deposition method, a sputtering method, and a chemical vapor deposition (CVD) method.

Additionally, instead of the transparent conductive layer, a protective film that protects the co-catalyst layer 46 may be provided on the surface of the co-catalyst layer 46.

The protective film is configured in conformity with the absorption wavelength of the co-catalyst layer 46. For example, oxides, such as $TiO_2$, $ZrO_2$, and $Ga_2O_3$, are used for the protective film. In a case where the protective film is an insulator, for example, the thickness thereof is 5 to 50 nm, and film formation methods, such as an atomic layer deposition (ALD) method, are selected. In a case where the protective film is conductive, for example, the protective film has a thickness of 5 to 500 nm, and may be formed by a sputtering method and the like in addition to the atomic layer deposition (ALD) method and a chemical vapor deposition (CVD) method. The protective film can be made thicker in a case where the protective film is a conductor than in a case where the protective film is insulating.

The invention is basically configured as described above. Although the photocatalyst electrode, the artificial photosynthesis module, and the artificial photosynthesis device according to the embodiments of the invention have been described above in detail, the invention is not limited to the above-described embodiments, and various improvements or modifications may be made without departing from the scope of the invention.

EXAMPLES

Hereinafter, the features of the invention will be more specifically described with reference to examples. Materials, reagents, amounts used, substance amounts, ratios, treatment contents, treatment procedures, and the like that are shown in the following examples can be appropriately changed, unless departing from the spirit of the invention. Therefore, the scope of the invention should not be restrictively interpreted by the specific examples shown below.

In the present examples, photocatalyst electrodes of Examples 1 to 8 and Reference Example were made, and photoelectrochemical measurements were performed by irradiating the respective photocatalyst electrodes of Examples 1 to 8 and Reference Example with simulated solar light in a state where the photocatalyst electrodes are immersed in a container (not illustrated) filled with an electrolytic solution to be described below.

In the photoelectrochemical measurements of the respective photocatalyst electrodes of Examples 1 to 8, and Reference Example, a reference electrode and a counter electrode were disposed within the container. Then, the photocatalyst electrodes, the reference electrode, and the counter electrode were connected to a potentiostat. In this case, the photocatalyst electrodes become working electrodes. Photoelectrochemical measuring methods will be described below in detail.

A light source of the simulated solar light, the electrolytic solution, the reference electrode, the counter electrode, and the potentiostat are shown below.

Light source of simulated solar light: solar simulator (air mass (AM)1.5G), XES-70S1 made by SAN-EI ELECTRIC CO. LTD Electrolytic solution: 1M $H_3BO_3$+KOH pH9.5

Electrochemical measuring device: potentiostat, HZ-5000 made by HUKUTO DENKO CORP.

Reference electrode: Ag/AgCl electrode

Counter electrode: platinum wire

Evaluation Conditions

In the photoelectrochemical measurements, regarding the photocatalyst electrodes of Examples 1 to 8 and Reference Example, measurements of $0.2\ V_{RHE} \rightarrow 1.2\ V_{RHE} \rightarrow 0.2\ V_{RHE}$ were repeated five times at a speed of 10 mV/min, and differences between a current density (mA/cm2) at the time of light radiation at the fifth $0.6\ V_{RHE}$ and a current density (mA/cm$^2$) in a case where fifth light is not radiated were measured.

Regarding small-sized BiVO$_4$ substrates to be described below, photoelectrochemical measurements were also performed on the same conditions as those of Examples 1 to 8 and Reference Example, and differences between a current density (mA/cm$^2$) at the time of light radiation at fifth $0.6\ V^{RHE}$ and a current density (mA/cm$^2$) in a case where fifth light is not radiated were measured. In addition, the expression "at the time of light radiation" means a case where the simulated solar light is radiated, and the expression "the case where light is not radiated means a case where the simulated solar light is not radiated.

As evaluations, the current density differences of the respective photocatalyst electrodes of Examples 1 to 8 and Reference Example were compared with the current density differences of the small-sized BiVO$_4$ substrates. As a result of the comparison, photocatalyst electrodes of which the current density differences can be secured to be 80% or more of those of the small-sized BiVO$_4$ substrates were defined as "A", photocatalyst electrodes of which the current density differences can be secured to be 75% or more and less than 80% of those of the small-sized BiVO$_4$ substrates were defined as "B", photocatalyst electrodes of which the current density differences can be secured to be 55% or more and less than 75% of those of the small-sized BiVO$_4$ substrates were defined as "C", photocatalyst electrodes of which the current density differences can be secured to be 50% or more and less than 55% of those of the small-sized BiVO$_4$ substrates were defined as "D", and photocatalyst electrodes of which the current density differences can be secured to be less than 50% of those of the small-sized BiVO$_4$ substrates were defined as "E". The evaluation results are shown in the following Table 1.

Hereinafter, the photocatalyst electrodes of Examples 1 to 8 and Reference Example will be described.

Example 1

<Mother Catalyst Formation>

A glass substrate on which an indium tin oxide (ITO) film was formed was prepared. The glass substrate is 10 cm×11 cm in sizes. A BiOI precursor was formed in a region of 10 cm×10 cm by the electrodeposition method, leaving a 1-cm portion on the glass substrate. Thereafter, a dimethyl sulfoxide solution (DMSO solution) in which VO(acac)$_2$(vanadyl acetylacetonate) was dissolved was added dropwise and baked, and a BiVO$_4$ substrate was formed.

<Co-Catalyst Formation>

The BiVO$_4$ substrate made as described above was immersed in an electrolytic solution in which iron ions and nickel ions were dissolved, and a co-catalyst was modified using light of air mass (AM) 1.5 G by a photo electrodeposition method.

<Evaluation>

A plurality of copper wires having a width of 0.1 mm were formed at width intervals of 20 mm on the formed BiVO$_4$ substrate of 10 cm×10 cm, linear metal electrical conductors were obtained, and the linear metal electrical conductors were protected with an epoxy adhesive. An ITO membrane portion of the BiVO$_4$ substrate was fixed with a clip, and a photoelectrochemical measurement was carried out.

In addition, regarding the linear metal electrical conductors, the order of application of wiring lines was studied, such as a process of performing mother catalyst formation and applying co-catalyst modification after wiring lines are applied before the mother catalyst formation, and a process of performing the co-catalyst modification after wiring lines are applied after the mother catalyst formation and before the co-catalyst modification. However, the obtained performance did not change.

<Small-Sized BiVO$_4$ Substrate>

Next, a method of making small-sized BiVO$_4$ substrate will be described.

A glass substrate on which an ITO film having a size of 2 cm×2.5 cm was formed was prepared. A BiOI precursor was formed in a region of 2 cm×2 cm by the electrodeposition method, leaving a 0.5-cm portion on the glass substrate, and a small-sized BiVO$_4$ substrate having a size of 2 cm×2 cm was obtained. Next, the co-catalyst modification was performed similarly to the above, and a photoelectrochemical measurement was also carried out on the small-sized BiVO$_4$ substrate as in the above-described evaluation.

Example 2

A plurality of copper wires having a width of 0.1 mm were formed at intervals of 20 mm on a glass substrate of 10 cm×11 cm. Thereafter, an ITO film that coats the copper wires is formed on the glass substrate. Accordingly, an ITO substrate was obtained on which a conductive layer having linear metal electrical conductors obtained by the copper wires being disposed at intervals of 20 mm was formed. A BiOI precursor was formed in a region of 10 cm×10 cm by the electrodeposition method, leaving a 1-cm portion on the ITO substrate of 10 cm×11 cm. Thereafter, a dimethyl sulfoxide solution (DMSO solution) in which VO(acac)$_2$ (vanadyl acetylacetonate) was dissolved was added dropwise and baked, and a BiVO$_4$ substrate was formed. Thereafter, the co-catalyst modification was performed by the same method as that of Example 1, an ITO membrane portion of the formed BiVO$_4$ substrate of 10 cm×10 cm was fixed with a clip, and a photoelectrochemical measurement was carried out.

Additionally, also in Example 2, a small-sized BiVO$_4$ substrate as described above was obtained similarly to Example 1. Then, the co-catalyst modification was applied as described above, and a photoelectrochemical measurement was carried out on the small-sized BiVO$_4$ substrate.

Example 3

A plurality of copper wires having a width of 0.1 mm were formed at intervals of 20 mm on a glass substrate of 10 cm×11 cm. Thereafter, the copper wires were processed using the photolithography. Thereafter, an ITO film that coats the copper wires is formed on the glass substrate. Since the subsequent manufacturing process and the photoelectrochemical measuring method are the same as those of Example 2, the detailed description thereof will be omitted.

Regarding Example 3, the taper angle was 60° in a case where a cross-section of the copper wires was observed using the scanning electron microscope.

Additionally, also in Example 3, a small-sized BiVO$_4$ substrate as described above was obtained similarly to Example 1. Then, the co-catalyst modification was applied as described above, and a photoelectrochemical measurement was carried out on the small-sized $BiVO_4$ substrate.

Example 4

A plurality of copper wires having a width of 0.1 mm were formed at intervals of 20 mm on a glass substrate of 10 cm×11 cm. Thereafter, the copper wires were processed using the photolithography. In that case, the processing was carried out by controlling the concentration of an etching reagent and the temperature of the etching reagent such that the etching rate is made to be about 2 times later than that of Example 3. Thereafter, an ITO film that coats the copper wires is formed on the glass substrate. Since the subsequent manufacturing process and the photoelectrochemical measuring method are the same as those of Example 2, the detailed description thereof will be omitted.

Regarding Example 4, the taper angle was 40° in a case where a cross-section of the copper wires was observed using the scanning electron microscope.

Additionally, also in Example 4, a small-sized $BiVO_4$ substrate as described above was obtained similarly to Example 1. Then, the co-catalyst modification was applied as described above, and a photoelectrochemical measurement was carried out on the small-sized $BiVO_4$ substrate.

Example 5

Since the manufacturing process and the photoelectrochemical measuring method except that plurality of copper wires having a width of 0.1 mm were formed at width intervals of 50 mm on the $BiVO_4$ substrate of 10 cm×10 cm are the same as those of Example 1, the detailed description thereof will be omitted.

Additionally, also in Example 5, a small-sized $BiVO_4$ substrate as described above was obtained similarly to Example 1. Then, the co-catalyst modification was applied as described above, and a photoelectrochemical measurement was carried out on the small-sized $BiVO_4$ substrate.

Example 6

A plurality of copper wires having a width of 0.1 mm were formed at intervals of 20 mm on a glass substrate of 10 cm×11 cm, and thereafter, the copper wires were processed using the photolithography. Since the subsequent manufacturing process and the photoelectrochemical measuring method are the same as those of Example 3, the detailed description thereof will be omitted.

Regarding Example 6, the taper angle was 10° in a case where a cross-section of the copper wires was observed using the scanning electron microscope.

Additionally, also in Example 6, a small-sized $BiVO_4$ substrate as described above was obtained similarly to Example 1. Then, the co-catalyst modification was applied as described above, and a photoelectrochemical measurement was carried out on the small-sized $BiVO_4$ substrate.

Example 7

A plurality of copper wires having a width of 0.1 mm were formed at intervals of 50 mm on a glass substrate of 10 cm×11 cm, and thereafter, the copper wires were processed using the photolithography. Since the subsequent manufacturing process and the photoelectrochemical measuring method are the same as those of Example 3, the detailed description thereof will be omitted.

Regarding Example 7, the taper angle was 40° in a case where a cross-section of the copper wires was observed using the scanning electron microscope.

Additionally, also in Example 7, a small-sized $BiVO_4$ substrate as described above was obtained similarly to Example 1. Then, the co-catalyst modification was applied as described above, and a photoelectrochemical measurement was carried out on the small-sized $BiVO_4$ substrate.

Example 8

Since the manufacturing process and the photoelectrochemical measuring method except that plurality of copper wires having a width of 0.1 mm were formed at width intervals of 5 mm on the $BiVO_4$ substrate of 10 cm×10 cm are the same as those of Example 1, the detailed description thereof will be omitted.

Additionally, also in Example 8, a small-sized $BiVO_4$ substrate as described above was obtained similarly to Example 1. Then, the co-catalyst modification was applied as described above, and a photoelectrochemical measurement was carried out on the small-sized $BiVO_4$ substrate.

Reference Example

A glass substrate on which an indium tin oxide (ITO) film was formed was prepared. The glass substrate is 10 cm×11 cm in sizes. A BiOI precursor was formed in a region of 10 cm×10 cm by the electrodeposition method, leaving a 1-cm portion on the glass substrate. Thereafter, a dimethyl sulfoxide solution (DMSO solution) in which $VO(acac)_2$(vanadyl acetylacetonate) was dissolved was added dropwise and baked, and a $BiVO_4$ substrate was formed. Thereafter, the co-catalyst modification was performed by the same method as that of Example 1, an ITO membrane portion of the formed $BiVO_4$ substrate of 10 cm×10 cm was fixed with a clip, and a photoelectrochemical measurement was carried out. Reference Example has a structure with no linear metal electrical conductors.

Additionally, also in Reference Example, a small-sized $BiVO_4$ substrate as described above was obtained similarly to Example 1. Then, the co-catalyst modification was applied as described above, and a photoelectrochemical measurement was carried out on the small-sized $BiVO_4$ substrate.

TABLE 1

|  | Evaluation results |
|---|---|
| Example 1 | B |
| Example 2 | C |
| Example 3 | C |
| Example 4 | B |
| Example 5 | D |
| Example 6 | A |
| Example 7 | D |
| Example 8 | D |
| Reference Example | E |

As shown in Table 1, the photocatalyst electrodes of Examples 1 to 8 were apparently lower in attenuation rates for the small-sized $BiVO_4$ substrates than the photocatalyst electrode of Reference Example. That is, the current density differences of the photocatalyst electrodes of Examples 1 to 8 can be secured to be 50% or more of the current density differences of the small-sized $BiVO_4$ substrates.

Example 3 having the taper angle of 60°, Example 4 having the taper angle of 40°, and Example 6 having the taper angle of 10° of which the intervals are the same as 20 mm and the taper angles are different from each other were smaller in attenuation rates for the small-sized BiVO$_4$ substrates than Example 2 that has the same configuration and does not particularly specify the taper angle. Additionally, in Example 4 and Example 7 having the taper angle of 40°, Example 4 having the intervals of 20 mm was smaller in attenuation rates for the small-sized BiVO$_4$ substrates. Additionally, Example 1 having the same configuration and the intervals of 20 mm was smaller in attenuation rates for the small-sized BiVO$_4$ substrates than Example 5 having the intervals of 50 mm and Example 8 having the intervals of 5 mm.

Regarding evaluations in modules, in a case where the electrodes of Examples 1 to 8 and Reference Example were respectively evaluated in a module form as illustrated in FIG. 9 instead of the container filled with the electrolytic solution, photoelectrochemical measurement results could be obtained in the same performance ranks as the evaluation results.

EXPLANATION OF REFERENCES 10, 10a: photocatalyst electrode
11, 50: container
11a: interior
12, 40: substrate
12a, 14a, 16a, 34a, 40a, 42a, 44a, 54a: surface
14, 15: transparent conductive layer
16, 44: photocatalyst layer
18, 46: co-catalyst layer
19, 47: co-catalyst particle
20: transparent conductor
23: linear metal electrical conductor
23a, 23b, 23c: side face
23d: lower base
23e: upper base
23f: point
24: protective film
25: metal conducting wire
30: artificial photosynthesis module
32: oxygen evolution electrode
34: hydrogen evolution electrode
36: external conducting wire
42: conductive layer
52: housing
52b: bottom face
52c: first wall face
52d: second wall face
53: diaphragm
53a: first compartment
53b: second compartment
54: transparent member
56a, 56b: supply pipe
58a, 58b: discharge pipe
60: artificial photosynthesis device
62: tank
63: pipe
64: pump
65: gas recovery unit
66: oxygen gas recovery unit
67: pipe for oxygen
68: hydrogen gas recovery unit
69: pipe for hydrogen
AQ: water
B: horizontal plane
D: direction
Di: traveling direction
Dr: direction
L: light
Lp: parallel line
Lt: tangent line
td: interval
wb, wu: length
α: taper angle
θ: angle

What is claimed is:

1. An artificial photosynthesis module comprising:
an oxygen evolution electrode that splits water with light to produce oxygen and has a photocatalyst layer, a transparent conductive layer, and a substrate in this order from an incidence direction of the light; and
a hydrogen evolution electrode that splits the water with the light to produce hydrogen and has a photocatalyst layer, a transparent conductive layer, and a substrate in this order from the incidence direction of the light,
wherein the oxygen evolution electrode and the hydrogen evolution electrode are disposed in series in a traveling direction of the light,
wherein the oxygen evolution electrode and the hydrogen evolution electrode are electrically connected to each other via a conducting wire,
wherein at least one electrode of the oxygen evolution electrode or the hydrogen evolution electrode has a linear metal electrical conductor that is disposed on the substrate so as to be in contact with the surface of the substrate, and the linear metal electrical conductor is buried within the transparent conductive layer and electrically connected to the conducting wire, and
wherein the linear metal electrical conductor is disposed at intervals of 5 mm or more and less than 50 mm.

2. The artificial photosynthesis module according to claim 1, wherein a length of an upper base of the linear metal electrical conductor is shorter than a length of a lower base.

3. The artificial photosynthesis module according to claim 1, wherein the linear metal electrical conductor has a taper angle.

4. The artificial photosynthesis module according to claim 3, wherein the taper angle is 5° or more and 60° or less.

5. The artificial photosynthesis module according to claim 1, wherein a thickness of the transparent conductive layer is 100 nm or more and 500 nm or less.

* * * * *

UNITED STATES PATENT AND TRADEMARK OFFICE
CERTIFICATE OF CORRECTION

PATENT NO. : 11,098,410 B2
APPLICATION NO. : 16/212297
DATED : August 24, 2021
INVENTOR(S) : Yoshihiro Aburaya et al.

Page 1 of 1

It is certified that error appears in the above-identified patent and that said Letters Patent is hereby corrected as shown below:

On the Title Page

Change:
"(73) Assignees: FUJIFILM Corporation, Tokyo (JP);
JAPAN TECHNOLOGICAL RESEARCH ASSOCIATION OF ARTIFICIAL
PHOTOSYNTHESIS CHEMICAL PROCESS, Tokyo (JP)"

To:
-- (73) Assignees: FUJIFILM Corporation, Tokyo (JP);
JAPAN TECHNOLOGICAL RESEARCH ASSOCIATION OF ARTIFICIAL
PHOTOSYNTHETIC CHEMICAL PROCESS, Tokyo (JP) --

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*